(12) United States Patent
Kobayashi et al.

(10) Patent No.: US 7,833,455 B2
(45) Date of Patent: Nov. 16, 2010

(54) ROBOT HAND MEMBER AND METHOD OF PRODUCING THE SAME

(75) Inventors: Takashi Kobayashi, Yokohama (JP); Kenichi Aoyagi, Yokohama (JP); Daisuke Uchida, Tokyo (JP)

(73) Assignee: Nippon Oil Corporation, Tokyo (JP)

( * ) Notice: Subject to any disclaimer, the term of this patent is extended or adjusted under 35 U.S.C. 154(b) by 1534 days.

(21) Appl. No.: 11/147,459

(22) Filed: Jun. 8, 2005

(65) Prior Publication Data

US 2005/0269826 A1 Dec. 8, 2005

Related U.S. Application Data

(63) Continuation-in-part of application No. 10/107,307, filed on Mar. 28, 2002, now abandoned.

(30) Foreign Application Priority Data

Mar. 29, 2001 (JP) ............................. 2001-097478
Mar. 29, 2001 (JP) ............................. 2001-097479
Apr. 13, 2001 (JP) ............................. 2001-115215

(51) Int. Cl.
*B29C 70/34* (2006.01)
*B23Q 3/00* (2006.01)

(52) U.S. Cl. .................... 264/258; 264/324; 269/58; 269/296; 156/307.1

(58) Field of Classification Search ............... 264/258, 264/322, 324; 269/58, 296; 156/307.1
See application file for complete search history.

(56) References Cited

U.S. PATENT DOCUMENTS

| 3,655,863 | A | * | 4/1972 | Andersen | .................. 264/294 |
|---|---|---|---|---|---|
| 4,098,088 | A | | 7/1978 | Mason | |
| 5,188,152 | A | * | 2/1993 | Ogawa | ........................ 138/129 |
| 5,765,277 | A | | 6/1998 | Jin et al. | |
| 5,811,951 | A | | 9/1998 | Young | |
| 6,290,889 | B1 | * | 9/2001 | Castanie et al. | ............. 264/219 |
| 6,490,504 | B2 | | 12/2002 | Son | |

(Continued)

FOREIGN PATENT DOCUMENTS

JP          56-142033          11/1981

(Continued)

OTHER PUBLICATIONS

Japanese Office Action (with translation) mailed Jan. 27, 2004, for Patent Appl. No. 2001-097478.

(Continued)

*Primary Examiner*—Matthew J. Daniels
(74) *Attorney, Agent, or Firm*—Finnegan, Henderson, Farabow, Garrett & Dunner, L.L.P.

(57) ABSTRACT

A robot hand member mounted on an arm unit of an industrial robot and a method of producing the same, wherein there are successively executed a step of laminating prepreg sheets each containing a reinforcing fiber on the outer peripheral surface of a core member having a predetermined shape in cross section, a step of heating the laminated prepreg sheets to a predetermined temperature to thermally set, to form a fiber reinforced plastic, and a step of removing the core member from the fiber reinforced plastic to obtain a hollow structure.

10 Claims, 10 Drawing Sheets

U.S. PATENT DOCUMENTS

| | | |
|---|---|---|
| 6,517,658 B1 | 2/2003 | Wageman et al. |
| 6,551,441 B1 | 4/2003 | Sato et al. |

FOREIGN PATENT DOCUMENTS

| | | |
|---|---|---|
| JP | 59-218170 | 12/1984 |
| JP | 62-202728 | 9/1987 |
| JP | 63-015737 | 1/1988 |
| JP | 6-349426 | 3/1988 |
| JP | 2-155722 | 6/1990 |
| JP | 04-265714 | 9/1992 |
| JP | 7-80948 | 3/1995 |
| JP | 7-186071 | 7/1995 |
| JP | 7-329199 | 12/1995 |
| JP | 08-052812 | 2/1996 |
| JP | 9-117968 | 5/1997 |
| JP | 10-315349 | 12/1998 |
| JP | 2000-24983 | 1/2000 |
| JP | 3073229 | 8/2000 |
| JP | 2000-343476 | 12/2000 |
| JP | 2001-044259 | 2/2001 |

OTHER PUBLICATIONS

Japanese Office Action (with translation) mailed Jan. 27, 2004, for Patent Appl. No. 2001-097479.

Japanese Office Action (with translation) mailed Jan. 27, 2004, for Patent Appl. No. 2001-115215.

Transcript of Decision of Final Rejection issued May 18, 2004, for JP 2001-097478.

Transcript of Decision of Final Rejection issued May 18, 2004, for JP 2001-097479.

Transcript of Decision of Final Rejection issued May 18, 2004, for JP 2001-115215.

English-language translation of portions of JP S55-154124, published Dec. 1, 1980 (1 page).

English-language translation of portions of JP H4-105926, published Apr. 7, 1992 (2 pages).

English-language translation of portions of JP H2-238930, published Sep. 21, 1990 (1 page).

* cited by examiner

1 ROBOT HAND
5
2 MOUNTING MEMBER
4
3 WORKPIECE
4 ROBOT HAND MEMBER

4

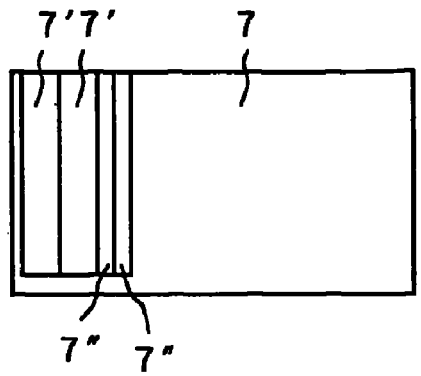
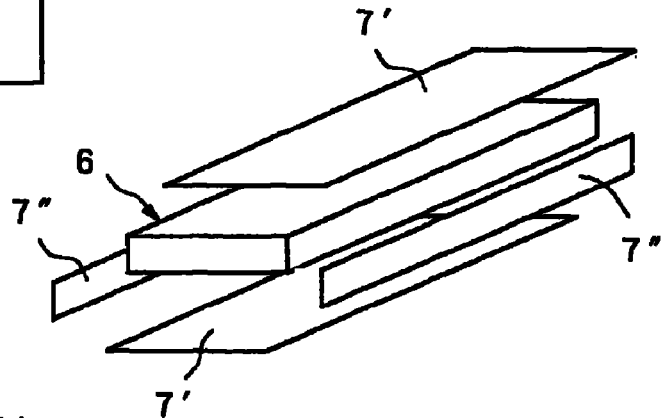
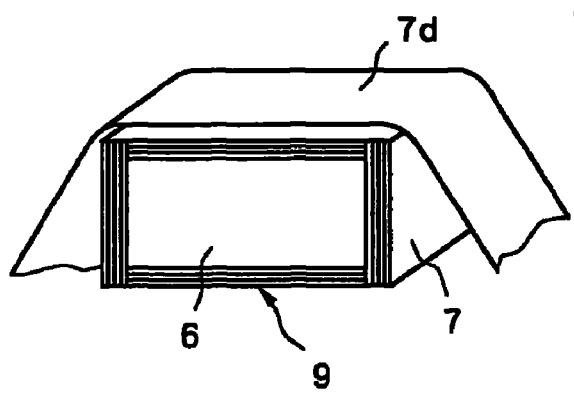
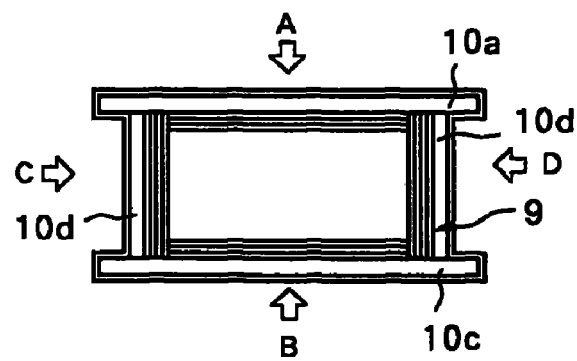
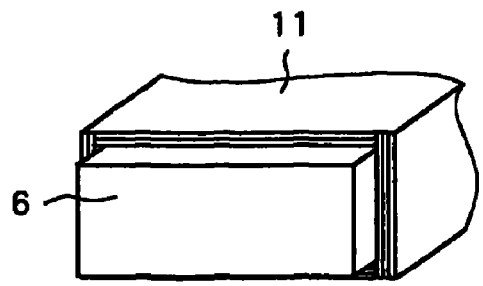

ROBOT HAND MEMBER AND METHOD OF PRODUCING THE SAME

This application is a continuation-in-part of U.S. patent application Ser. No. 10/107,307, filed Mar. 28, 2002 now abandoned, the subject matter of which is incorporated herein by reference.

DESCRIPTION OF THE INVENTION

1. Field of the Invention

The present invention relates to a robot hand member to be mounted on an arm unit of an industrial robot and to a method of producing the same. More specifically, the invention relates to a robot hand member made of fiber reinforced plastic obtained by thermally setting a prepreg sheet containing a reinforcing fiber laminated on the outer peripheral surface of a core member, and to a method of producing the same.

2. Background of the Invention

Glass substrates that have been produced in increased sizes accompanying a widespread use of liquid crystal displays (LCDs), have required an increase in size of a substrate-conveyer robot hand to be used in the production process of precision parts such as LCDs, plasma display panels (PDPs), silicon wafers and the like. Further, a robot hand for conveying large plasma display panels (PDPs) has a size larger than that of the robot hand for conveying the LCDs.

Metals such as steel, stainless steel and aluminum have heretofore been used as materials of robot hands. Accompanying an increase in size of the robot hands in recent years, however, it is a trend to use fiber reinforced plastics (hereinafter abbreviated as "FRPs"). In particular, there has been widely used a robot hand member made of solid member of a carbon fiber reinforced (hereinafter abbreviated as "CFRP").

At the present time where the size is ever increasing, however, the solid member of CFRP causes the robot hand itself to become heavy resulting in an increased deflection due to its own weight. Further, as the robot hand becomes heavy, a load on a robot drive system is increased, thereby affecting the design of the robot and the cost thereof. The deflection due to its own weight can be decreased to some extent by decreasing the weight, i.e., by decreasing the thickness of the robot hand member or by decreasing the width of a support surface. With this countermeasure, however, since the flexural rigidity of the robot hand is lowered, the deflection (deflection due to the load) is increased at the time of supporting the workpiece. When a long robot hand member is cantilevered, in particular, deflection at an end thereof is increased, and vibration is increased when the workpiece is supported, causing a trouble in supporting or conveying the workpiece.

As disclosed in Japanese Unexamined Patent Publication No. 2000-343476, there has been proposed a technology of producing a robot hand by separately forming a skin layer of a plate-like carbon fiber reinforced plastic (CFRP) obtained by heating to thermally set a laminate of a plurality of prepreg sheets each containing a carbon fiber, and a core layer similarly made of the CFRP, laminating the skin layers on the upper surface and on the lower surface of the core layer which serves as a core member, and adhering together the core layer and the skin layer with an adhesive.

As the skin layer, in this case, a plurality of prepreg sheets containing carbon fibers oriented in different directions are laminated one upon another, to improve the flexural rigidity, vibration attenuation characteristics and heat resistance. As the core layer, further, a CFRP member and a honeycomb core member made of metal such as aluminum and an aggregate of fibers, are combined with each other, to improve the flexural rigidity, vibration attenuation characteristics and heat resistance while reducing the weight.

According to this method, however, since there are once formed, as materials, the skin layer comprising the CFRP having a predetermined thickness and a predetermined area, and the core layer similarly comprising the CFRP, the skin layers are adhered onto the upper and lower surfaces of the core layer which serves as a core member with an adhesive, and the thus obtained laminate is cut into predetermined length and width so as to be worked into a predetermined shape, an increased number of production processes is required. Therefore, a period of time required for the production becomes longer and the cost for the production becomes high.

There has further been contrived a method of adhering with an adhesive four CFRP plates each formed in a predetermined thickness, to form a square pipe. This method, however, requires a step of laminating prepreg sheets, a step of forming the CFRP plates by the thermosetting, and a step of adhering the CFRP plates, and also there is such a problem that the portions where the CFRP plates are adhered have the low strength against a load.

The robot hand member has been designed for conveying, as the workpieces, precision parts, such as, liquid crystal displays, plasma display panels, silicon wafers and the like, and is required to have flatness so as to avoid the scar on such workpieces. If the robot hand member has a hollow structure, however, the central portion is likely to be dented.

SUMMARY OF THE INVENTION

Therefore, it is an object of the present invention to cope with the above-mentioned problem, and to provide a robot hand member having the high strength against a load, the low deflection and a high degree of flatness, requiring a short period of time and a low cost for production, and a method of producing the same.

In order to accomplish the above-mentioned object, a robot hand member according to the present invention, which is mounted on an arm unit of an industrial robot, has a predetermined shape in cross section, and extends in a longitudinal direction, is constituted such that prepreg sheets each containing a reinforcing fiber are laminated on the outer peripheral surface of a core member, the laminated prepreg sheets are heated to a predetermined temperature to be thermally set, to form a fiber reinforced plastic, and then, the core member is removed from the fiber reinforced plastic.

According to the above constitution, it is possible to form a robot hand member with a small number of production processes and a low production cost. By using the fiber reinforced plastic, further, it is possible to produce a robot hand member which is lighter in weight than the one made of metal, having excellent flatness, flexural rigidity, vibration attenuation characteristics and heat resistance. Further, since the core member is removed to form a hollow structure, it is possible to further improve the light in weight, and besides, it is possible to arrange, in the hollow portion, the devices, wirings, pipe arrangement and the like necessary for the functions of the robot hand. Further, since the core member can be repetitively used, it is possible to lower the material cost.

A method of producing the robot hand member described above comprises the steps to be sequentially executed of: winding prepreg sheet each containing a reinforcing fiber on the outer peripheral surface of a core member that is in a predetermined shape in cross section and is made of material that is not deformed by the heating at temperatures equal to or lower than a predetermined temperature; molding the outer surface shape of the prepreg sheets into a predetermined size by pushing an outer mold having a predetermined inner surface shape onto the outer peripheral surface of the wound prepreg sheets; heating the molded prepreg sheets to the predetermined temperature to thermally set the heated prepreg sheets, to form a fiber reinforced plastic; and removing the core member from the fiber reinforced plastic to form a hollow structure.

Further, another method of producing the robot hand member described above comprises the steps to be sequentially executed of: dividing, into a plurality of regions, the outer peripheral surface of a core member that is in a predetermined shape in cross section and is not deformed by the heating at temperatures equal to or lower than a predetermined temperature and adhering prepreg sheets each containing a reinforcing fiber onto each of the divided regions; heating the core member onto which the prepreg sheets are adhered, to the predetermined temperature, to thermally set the member to form a fiber reinforced plastic; and removing the core member from the fiber reinforced plastic to form a hollow structure. In this case, since the prepreg sheets are adhered to each of the regions divided on the outer peripheral surface of the core member, the corner portions are not swollen toward the outer side. Therefore, there is no need of using a dedicated outer mold that meets the outer surface shape of the robot hand member.

Another robot hand member according to the present invention, which is mounted on an arm unit of an industrial robot, has a predetermined shape in cross section, and extends in a longitudinal direction, is constituted such that prepreg sheets each containing a reinforcing fiber is laminated on the whole of or a part of the outer peripheral surface of a core member, the core member laminated with the prepreg sheets are heated to a predetermined temperature to be thermally set, to form a fiber reinforced plastic that is integrated with the core member.

According to this constitution, it is possible to form a robot hand member with a small number of production processes and a low production cost. By using the fiber reinforced plastic, further, it is possible to produce a robot hand member which is lighter in weight and has a less deflection characteristic. Further, since the core member is left to stay therein to form a solid structure, the central portion of the robot hand member is prevented from being dented, thereby improving the flatness. Note, by using, as a core member, a light-weight member such as a synthetic resin that is lighter than the fiber reinforced plastic, it is possible to further decrease the weight.

A method of producing the robot hand member described above comprises the steps to be sequentially executed of: winding prepreg sheets each containing a reinforcing fiber on the outer peripheral surface of a core member that is in a predetermined shape in cross section and is made of material that is not deformed by the heating at temperatures equal to or lower than a predetermined temperature; molding the outer surface shape of the prepreg sheets into a predetermined size by pushing an outer mold having a predetermined inner surface shape onto the outer peripheral surface of the wound prepreg sheets; and heating the molded prepreg sheets to the predetermined temperature to thermally set the heated prepreg sheets, to form a fiber reinforced plastic that is integrated with the core member.

Another method of producing the robot hand member described above comprises the steps to be sequentially executed of: dividing, into a plurality of regions, the outer peripheral surface of a core member that is in a predetermined shape in cross section and is not deformed by the heating at temperatures equal to or lower than a predetermined temperature and adhering prepreg sheets each containing a reinforcing fiber onto at least one of the divided regions; heating the core member onto which the prepreg sheets are adhered, to the predetermined temperature, to thermally set the member, to form a fiber reinforced plastic.

A further method of producing the robot hand member described above comprises the steps to be sequentially executed of: dividing, into a plurality of regions, the outer peripheral surface of a core member that is in a predetermined shape in cross section and is not deformed by the heating at temperatures equal to or lower than a predetermined temperature and adhering prepreg sheets each containing a reinforcing fiber onto each of the divided regions; heating the core member onto which the prepreg sheets are adhered, to the predetermined temperature, to thermally set the member, to form a fiber reinforced plastic that is integrated with the core member. In this case, the prepreg sheets in the regions adjacent to one another are bonded and adhered to one another to constitute the FRP on the whole of the outer peripheral surface of the core member. Therefore, by using a core member in lightweight, it is possible to produce a robot hand member having a merit of the solid FRP member, a favorable anti-deflection characteristic and flatness.

A robot hand member according to the present invention, which is mounted on an arm unit of an industrial robot and is made of fiber reinforced plastic, is formed in a hollow rectangular shape in transverse cross section and is formed with, in an inner space of a constituent member extending in a longitudinal direction, at least one rib that extends across the long sides opposing to each other in the transverse cross section, and also extends in a longitudinal direction of the inner space.

According to this constitution, since the long sides constituting the transverse cross section are connected to each other via the rib, the long sides is substantially shortened in length to increase the rigidity thereof. Since the rigidity of the long sides in the transverse cross section is improved, the dent at the center of the long sides is decreased and, hence, the flatness (that is, precision) of the robot hand member is improved.

A method of producing the robot hand member described above comprises the steps to be sequentially executed of: arranging core members each of which has a rectangular shape in transverse cross section and is not deformed by the heating at temperatures equal to or lower than a predetermined temperature, on both side surfaces of a rib-constituting member formed in a rectangular shape in transverse cross section and containing a reinforcing fiber, to form a composite structure having a rectangular shape in cross section as a whole; laminating prepreg sheets each containing a reinforcing fiber in a predetermined thickness on the outer peripheral surfaces of the composite structure; heating the composite structure on which the prepreg sheets are laminated to the predetermined temperature, to form a fiber reinforced plastic in which the rib-constituting member and the prepreg sheets are integrated; and removing the core members from the fiber reinforced plastic.

According to this constitution, if a plurality of kinds of core members and rib-constituting members having different sizes are prepared, by arbitrarily combining these members, a robot hand member of a predetermined size having a rib in an inner space thereof can be easily produced.

Another method of producing the robot hand member described above comprises the steps to be sequentially executed of: laminating prepreg sheets each containing a reinforcing fiber in a predetermined thickness on the outer peripheral surfaces of core members each of which has a rectangular shape in transverse cross section and is not deformed by the heating at temperatures equal to or lower than a predetermined temperature; bringing the plurality of core members on which the prepreg sheets are laminated, respectively, into contact with one another on their side surfaces to form a composite structure having a rectangular shape in cross section as a whole; laminating prepreg sheets each containing a reinforcing fiber in a predetermined thickness on the outer peripheral surface of the composite structure; heating the composite structure on which the prepreg sheets are laminated to the predetermined temperature, to form a fiber reinforced plastic in which the prepreg sheets laminated on the core members and the prepreg sheets laminated on the composite structure are integrated; and removing the core members from the fiber reinforced plastic. In this case, there is an advantage in that no rib-constituting member is necessary.

In the above-mentioned production method, the step of laminating prepreg sheets in a predetermined thickness may be executed so that the prepreg sheets formed to meet the shape of the surface of the composite structure or the shapes of the surfaces of the core members are adhered and laminated on the surface of the composite structure or the surfaces of the core members. By adhering the prepreg sheets formed to meet the shape of the surface of the composite structure or the shapes of the surfaces of the core members, the prepreg sheets are laminated in the predetermined thickness.

In the above-mentioned production method, further, the step of laminating prepreg sheets in a predetermined thickness may wind to laminate the prepreg sheets on the outer peripheral surface of the composite structure or the outer peripheral surfaces of the core members. By winding the prepreg sheets on the outer peripheral surface of the composite structure or the outer peripheral surfaces of the core members, the prepreg sheets are laminated in the predetermined thickness.

A further method of producing the robot hand member described above comprises the steps to be sequentially executed of: bringing a plurality of unit constituent members each having a hollow rectangular shape in transverse cross section and containing a reinforcing fiber into contact with one another on their side surfaces, to form a composite structure having a rectangular shape in cross section as a whole; adhering prepreg sheets each containing a reinforcing fiber over the side surfaces on the same sides intersecting the contacting surfaces of the composite structure; and heating the composite structure onto which the prepreg sheets are adhered, to a predetermined temperature, to form a fiber reinforced plastic in which the unit constituent members and the prepreg sheets are integrated.

In the above-mentioned production method, the step of adhering prepreg sheets may wind to adhere the prepreg sheets onto the outer peripheral surface of the composite structure. According to this constitution, since the prepreg sheets are wound on the outer peripheral surface of the composite structure, the step between the adjacent unit constituent members is concealed and the appearance of the robot hand is improved.

In the above-mentioned methods, the step of winding or adhering prepreg sheets onto the outer surfaces of the core member or the surface of the composite structure may include a step of winding or adhering the prepreg sheets in a multi-layer. Thus, it becomes possible to suitably design prepreg sheet laminates of different thickness and, hence, to control the flexural rigidity of the robot hand member.

The step of winding or adhering prepreg sheets in a multi-layer may further include a step of laminating the prepreg sheets in a manner that the reinforcing fibers therein are oriented differently to each other in a direction along the longitudinal direction and in a direction nearly at a right angle with the longitudinal direction. According to this constitution, it becomes possible to control the flexural rigidity, the vibration attenuation characteristics, the heat resistance and the like of the robot hand member in accordance with an environment in which the robot hand is used.

Further, the step of winding or adhering prepreg sheets in a multi-layer may include a step of winding a cloth prepreg sheet on the outermost layer on which the prepreg sheets are wound or adhered. According to this constitution, the fluffing in a subsequent working of cutting or polishing is reduced. Thus, the working performance as a member is improved, and the product that is finally obtained exhibits improved appearance.

BRIEF DESCRIPTION OF THE DRAWINGS

FIGS. 6A-6E are diagrams for explaining processes of a second method of producing the robot hand member of the first embodiment;

FIGS. 14A-14D are views illustrating a production method corresponding to a case where the robot hand member of the third embodiment is long, wherein FIG. 14A is a side view of the robot hand member, FIG. 14B is a sectional view along E-E in FIG. 14A, FIG. 14C is a sectional view along F-F in FIG. 14A, and FIG. 14D is a sectional view along G-G in FIG. 14A.

DESCRIPTION OF THE EMBODIMENTS

Embodiments of the present invention will now be described in detail with reference to the accompanying drawings.

Figure 1:
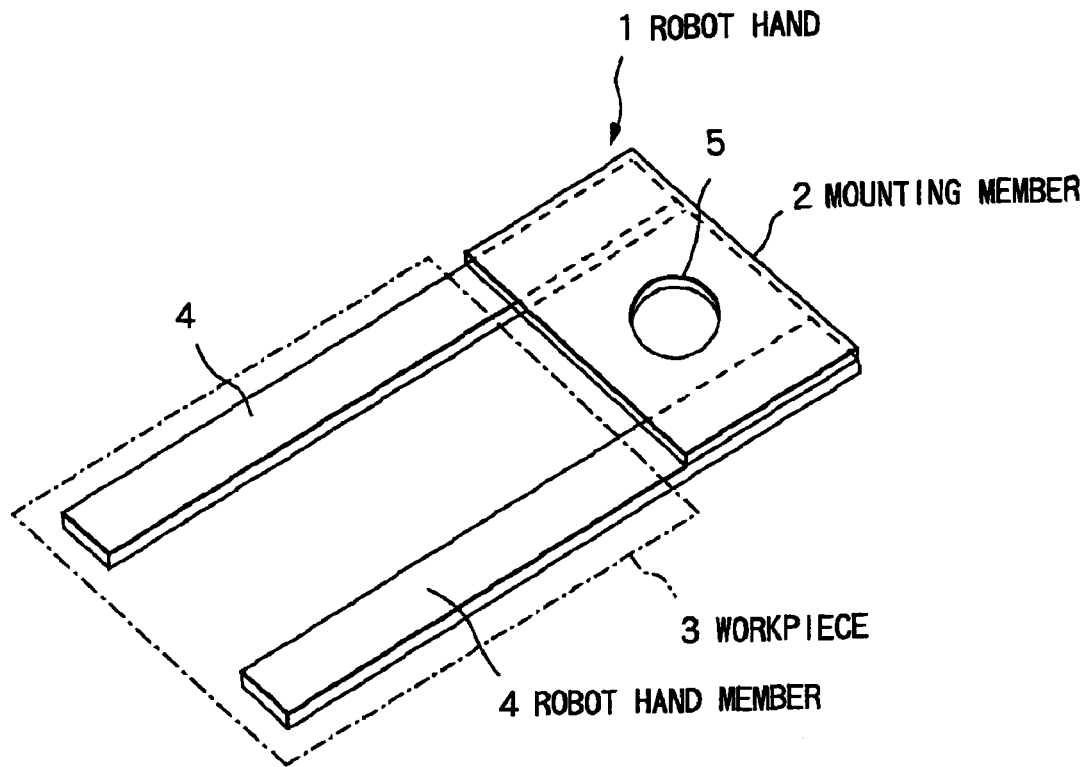
FIG. 1 is a perspective view illustrating a robot hand to which a robot hand member of the present invention is applied.

FIG. 1 is a perspective view illustrating a robot hand 1 to which a robot hand member of the present invention is applied. The robot hand 1 is mounted on an arm unit of an industrial robot, and comprises a flat plate-like mounting member 2 for mounting the robot hand 1 on the arm unit of the robot (not shown) and a robot hand member 4 secured to the mounting member 2 to support a workpiece 3. In FIG. 1, reference numeral 5 denotes a mounting hole perforated in the mounting member 2 for mounting the robot hand 1 on the arm unit of the robot. The robot hand member 4 supports and conveys the workpiece 3 such as a glass substrate or the like, for example, a liquid crystal display (LCD), a plasma display panel (PDP) or a semiconductor wafer, and is made of fiber reinforced plastic (FRP) so as to achieve a lightweight, excellent flatness, flexural rigidity and heat resistance.

Figure 2:
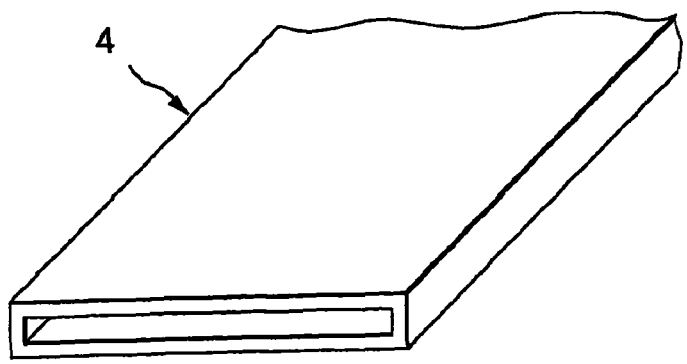
FIG. 2 is a perspective view illustrating a robot hand member of a first embodiment according to the present invention.

FIG. 2 illustrates a robot hand member 4 of a first embodiment according to the present invention. The robot hand member 4 is in the form of a hollow square pipe having a hollow structure constituted such that prepreg sheets each containing a reinforcing fiber are laminated on the outer peripheral surface of a core member, the laminated prepreg sheets are heated to a predetermined temperature to be thermally set, to form a fiber reinforced plastic, and the core member is removed from the thus formed fiber reinforced plastic. Two robot hand members 4 are mounted in parallel with each other on the mounting member 2 by using screws or the like, and each has a size of about 50 mm in width and about 1500 mm in length. The mounting member 2 and the robot hand members 4 may be integrated.

A first method of producing the root hand member 4 will now be described with reference to FIG. 3.

Figure 3A:
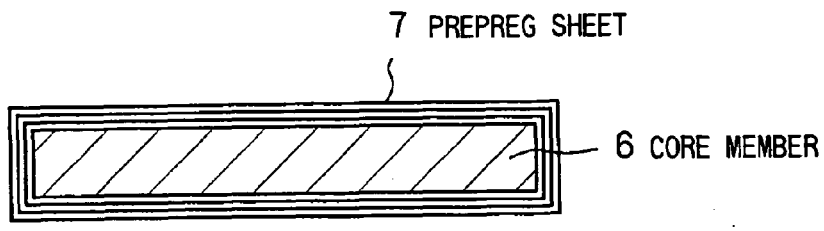
FIGS. 3A-3D are sectional views illustrating processes of a first method of producing the robot hand member of the first embodiment.

Referring to FIG. 3A, first, prepreg sheets 7 each containing a reinforcing fiber are wound in a multi-layer on the outer peripheral surface of a core member 6 made of material that is not deformed by the heating at temperatures equal to or lower than a predetermined temperature and has a predetermined shape in cross section.

The core member 6 serving as a base member on which the prepreg sheets 7 are to be wound, is not substantially deformed by the heating at temperatures less than a temperature which is slightly higher than the temperature in a process in which a prepreg sheet laminate 9 that will be described later is heated to the predetermined temperature (although different depending on the resin, usually about 100 to about 190° C.) to be thermally set, and also the core member 6 is made of material that can be easily removed from the FRP after the heating and thermosetting, to be formed, for example, in a rectangular rod in cross section. Here, the wording "the core member 6 is not substantially deformed by the heating" means that the core member 6 is not melted or is not deformed by the heating due to such as warping, bending, deflection, twisting, wrinkling or folding in the process of heating to thermally set the prepreg sheet laminate 9. The core member 6 is made of metal such as aluminum, steel or stainless steel, or a resin such as an MC nylon resin or a polyimide resin. The above metal or resin has a coefficient of thermal expansion larger than that of FRP, and therefore is contracted by cooling after it has been heated, and is easily removed. As required, further, a parting material may be applied to the surface of the core member. The parting material may be a chemical (e.g., surfactant, etc.) that is applied by spraying, or may be a parting sheet such as Teflon sheet.

The prepreg sheet 7 is a sheet of a so-called one-direction member such as a one-direction plain-woven fabric or a one-direction non-woven fabric in which the reinforcing fibers are oriented in one direction, a two-direction member such as a plain-woven fabric, a twilled fabric or a satin-woven fabric in which the reinforcing fibers are oriented in two directions, or a three-direction member such as a triaxially-woven fabric in which the reinforcing fibers are oriented in three directions, which is impregnated in advance with a matrix resin, and is placed in a state of not yet thermally set having a viscosity to some extent.

In this case, a carbon fiber is generally used as the reinforcing fiber from the standpoint of attaining rigidity and lightweight. It is, however, also possible to use a glass fiber, an aramide fiber or a silicon carbide fiber other than the carbon fiber. For example, for a plurality of prepreg sheets 7 to be laminated, carbon fiber prepreg sheets may be mainly used, and prepreg sheets containing the glass fiber or any other fiber may be partially used to the extent that the supporting performance or the conveying performance of the robot hand member is not damaged. The carbon fibers can be classified into two types; i.e., polyacrylonitrile-based (PAN) carbon fibers and pitch-based carbon fibers depending upon the starting materials. The pitch-based carbon fibers have high elasticity of 490 to 950 GPa, while the PAN-based carbon fibers have elasticity of about 230 to about 490 GPa and high tensile strength.

As the matrix resin, further, there can be used a thermoset resin such as epoxy resin, phenol resin, cyanate resin, unsaturated polyester resin, polyimide resin or bismaleimide resin. In order to impart shock resistance and toughness, further, there can be used the one obtained by adding fine particles of a rubber or a resin to the thermoset resin or the one obtained by dissolving a thermoplastic resin in the thermoset resin. Here, the rubber to be used as fine particles may be a nitrile rubber, a butadiene rubber, a styrene-butadiene rubber, a butadiene-nitrile rubber, acrylic rubber or a butyl rubber. Further, the resin to be used as fine particles may be a thermoset resin or a thermoplastic resin. As the thermoset resin, there can be used an epoxy resin, a phenol resin, an unsaturated polyester resin, an amino resin or a urethane resin. As the thermoplastic resin, there can be used a polyimide resin, a polyacrylate resin, a polyvinyl acetate resin, a polyamide resin, a polyaramide resin or a polycarbonate resin. As the thermoplastic resin to be dissolved in the thermoset resin, there can be used a polysulfone resin, a polycarbonate resin, a polyether sulfone resin, a polyether imide resin, an aromatic polyester resin, a polyvinyl formal resin, a polyamide resin, or a polyimide resin.

Figure 4:
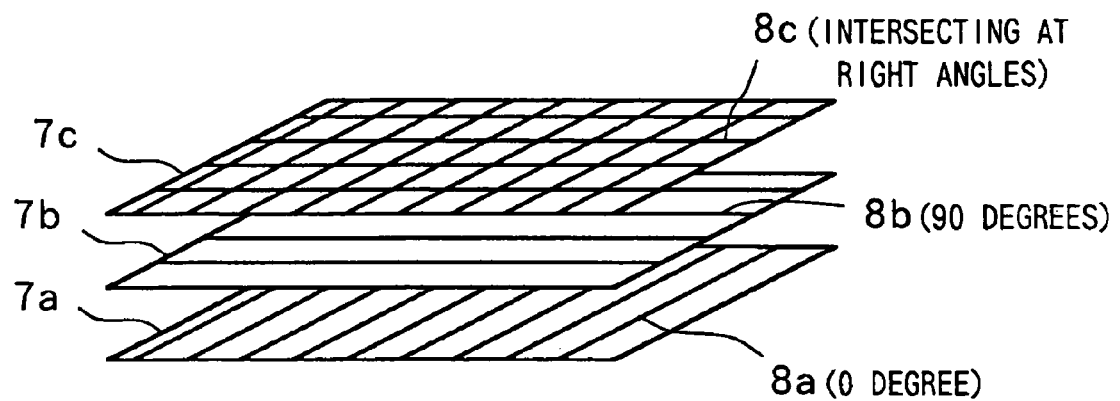
FIG. 4 is a diagram for explaining a state where prepreg sheets are laminated in a manner that reinforcing fibers of the prepreg sheets are oriented in directions different to each other in a process of winding the prepreg sheets in a multi-layer in the production method.

Here, the process of winding the prepreg sheets 7 in a multi-layer is executed, as shown in FIG. 4, such that the prepreg sheets 7 are laminated in a manner that the reinforcing fibers are oriented in different directions. That is, the prepreg sheets are laminated so that a reinforcing fiber 8a of a prepreg sheet 7a of a given layer is oriented in a direction of 0 degree, and a reinforcing fiber 8b of a prepreg sheet 7b of another layer is oriented in a direction of 90 degrees. There may be further laminated a prepreg sheet 7c of a further layer in addition to the above-mentioned prepreg sheets. In this case, a reinforcing fiber 8c of the prepreg sheet 7c may be a cloth prepreg sheet in which the reinforcing fibers oriented in two directions are intersecting at an angle of 90 degrees, or may be the one constituted by laminating a pair of the one-directional prepreg sheets at angles of ±45 degrees with respect to a longitudinal direction. In this state, the prepreg sheets 7a, 7b and 7c of the respective layers are successively laminated in a suitable thickness, so that the final thickness will be from about 1 to about 7 mm. The thickness of the laminate in this case will be slightly larger than the required thickness of the FRP plate of the robot hand member taking into consideration a reduction in the volume at the time when the prepreg sheets are heated to be thermally set.

An example of laminating the prepreg sheets 7 in a multi-layer will be described in detail hereunder. Referring to FIG. 3A, an innermost layer prepreg sheet 7 to be laminated in contact with the core member 6 has the reinforcing fiber oriented in a direction of, for example, 0 degree or 90 degrees with respect to the longitudinal direction. A second prepreg sheet 7 to be laminated on the above innermost layer has the reinforcing fiber oriented in a direction of, for example, 0 degree with respect to the longitudinal direction, to prevent deflection in the longitudinal direction and to improve the vibration attenuation characteristics. A third prepreg sheet 7 to be laminated on the above-mentioned second prepreg sheet 7 has the reinforcing fiber oriented in a direction of, for example, 90 degrees with respect to the longitudinal direction, to improve flexural rigidity, to improve the vibration attenuation characteristics for flexural vibration and to prevent warping and deflection, of the whole member inclusive of the laminated two prepreg sheets 7. In addition to the above, there may be added a layer of prepreg sheet 7 having reinforcing fibers oriented in the directions of, for example, ±45 degrees with respect to the longitudinal direction. In this case, it is possible to improve the torsional rigidity and the torsional vibration attenuation characteristics in the member as a whole. It is further possible to laminate a cloth prepreg sheet as the outermost layer other than the prepreg sheets 7. The cloth prepreg sheet is the one constituted by a woven fabric of reinforced fiber. The reinforcing fiber is preferably a carbon fiber, a glass fiber, an aramid fiber or a silicon carbide fiber, and plain-woven, twilled-woven, satin-woven or triaxially woven can be appropriately used. The cloth prepreg sheet is laminated in order to decrease fluffing in a subsequent process of cutting or grinding, to improve workability and to improve appearance of the product.

As for order for laminating the prepreg sheets 7 in a multi-layer, it is preferable to laminate the 90-degree-oriented sheet as the lowermost layer (innermost layer) from the standpoint of easily removing the core member 6. This is because the carbon fiber has a degree of heat shrinkage lower than that of the matrix resin and, hence, the degree of shrinkage for the sheet becomes such that the degree of shrinkage in the fiber orientation direction becomes lower than that in the fiber arrangement direction. The 90-degree-oriented sheet is used for the inner surface of the pipe-like FRP plate, so that the carbon fiber is oriented so as to surround the outer peripheral surface of the core member 6. Therefore, when subjected to the thermosetting, the diameter of the pipe-like FRP plate is not so much contracted.

Further, the prepreg sheets (outer sheets) to be laminated on the upper layers contribute highly to the improvement of characteristics (flexural rigidity, etc.) of the robot hand member. It is therefore preferable that the 0-degree-oriented sheet is laminated on an upper layer of the 90-degree-oriented sheet from the standpoint of prevention of deflection. The combination of the prepreg sheets to be used and order of lamination may be determined while taking the above-mentioned points into consideration.

Figure 3B:
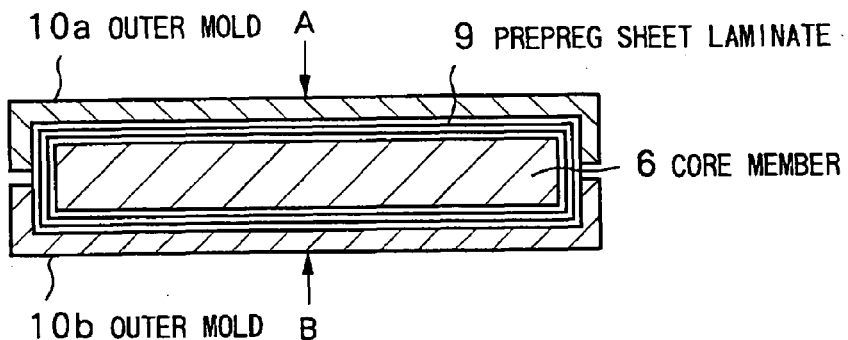

Next, as shown in FIG. 3B, outer molds 10a and 10b each having a predetermined inner surface shape are pushed onto the outer peripheral surface of the prepreg sheet laminate 9 wound with the prepreg sheets in a multi-layer, to mold the outer surface shape of the prepreg sheet laminate 9 in a predetermined size. This is because, as the prepreg sheets 7 are wound in an increased number of layers on the core member 6 shown in FIG. 3A, the corners swell toward the outer side and the shape at the corners lacks uniformity. Therefore, the corners are molded in an appropriate right-angled shape. For this purpose, the two channel-shaped outer molds 10a and 10b each having an inner peripheral surface of a U-shape are arranged so as to face each other over and under the prepreg sheet laminate 9, and are pushed as indicated by arrows A and B in the same manner as a press work. Thereby, the corners of the prepreg sheet laminate 9 are pushed into an appropriate right-angled shape by the U-shaped inner surface shape of each of the outer molds 10a and 10b.

Figure 3C:
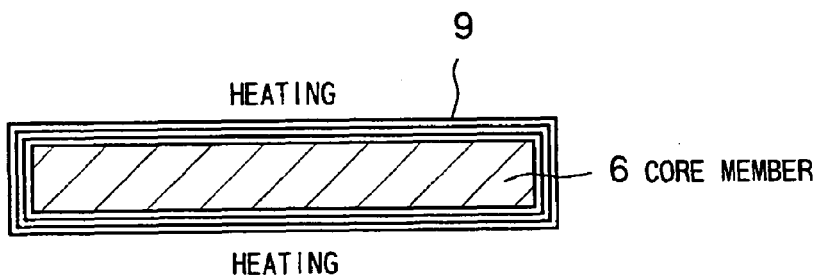

Next, as shown in FIG. 3C, the thus molded prepreg sheet laminate 9 is heated to the predetermined temperature to be thermally set, to form a fiber reinforced plastic (FRP). At this time, the whole prepreg sheet laminate 9 is put into, for example, a vacuum bag to be heated. The heating temperature conditions are such that the temperature is elevated at a rate of, for example, 2 to 10° C./min from the room temperature, maintained at about 100 to 190° C. for about 60 minutes, thereafter heating is stopped, and the prepreg sheet laminate 9 is allowed to cool naturally down to the room temperature. Thereby, the whole prepreg sheet laminate 9 is thermally set to form the FRP. Here, the core member 6 is made of material that is not deformed by the heating at temperatures equal to or lower than the predetermined temperature and, hence, correctly maintains the sectional shape thereof without substantially deformed through the above-mentioned heating process. Note, the prepreg sheet laminate 9 is put into the vacuum bag in order to suck air bubbles staying among the sheets formed in the laminating process, and to apply the substantially uniform external pressure (atmospheric pressure) onto the prepreg sheet laminate 9.

Figure 3D:
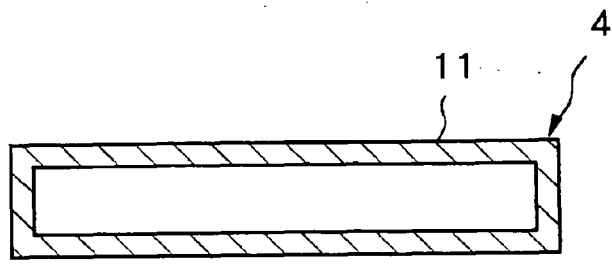

Next, as shown in FIG. 3D, the core member 6 is removed from the FRP member 11 to realize a hollow structure. Thus, a robot hand member 4 in the form of a square pipe is produced as shown in FIG. 2.

Since the robot hand member 4 in this embodiment is not constituted as a solid FRP member but is constituted as a hollow structure, it is possible to realize a reduction in weight without decreasing the volume of the robot hand member itself (i.e., without decreasing the thickness or the width). In a case of, for example, a long robot hand member 4 to be mounted on the mounting member 2, it is possible to avoid that the end thereof is deflected or vibrated by its own weight or by a load of the workpiece, so that the accuracy of supporting and conveyance of the workpiece 3 can be improved. The hollow portion of the square pipe can be utilized to arrange a tube for blowing or sucking air in order to support and convey the workpiece 3, and also to arrange electric wires for sensors that detect the presence or holding of the workpiece 3.

Figure 5:
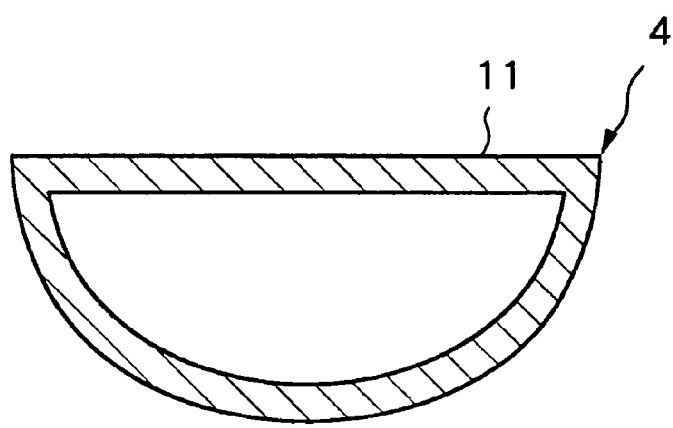
FIG. 5 is a sectional view illustrating a modified example of sectional shape of the robot hand member of the first embodiment.

The sectional shape of the robot hand member 4 is not limited to the above-mentioned square pipe but may be of any shape, such as a triangular shape, a polygonal shape, a circular shape or a semi-circular shape. As shown in FIG. 5, for example, the robot hand member 4 may be of the shape of a pipe having a flat upper surface and an arcuate lower surface. In this case, the core member shown in FIG. 3A has a sectional shape with a flat upper surface and an arcuate lower surface. In the foregoing description, the prepreg sheets 7 are wound in a multi-layer on the outer peripheral surface of the core member 6. However, the present invention is not limited thereto, when the prepreg sheet 7 is formed in a predetermined thickness to have the flexural rigidity and vibration attenuation characteristics, such a prepreg sheet 7 may be wound in a single layer.

Next, a second method of producing the robot hand member 4 will be described with reference to FIG. 6.

First, in a preparation process, the core member 6 and starting prepreg sheets 7 are prepared. The core member 6 is formed to meet the shape of the robot hand member 4, and is made of member having a rectangular shape in transverse cross section. As the starting prepreg sheets 7, various types of prepreg sheets are prepared, in which the types of reinforcing fibers are different, the densities of reinforcing fibers are different relative to the matrix resin, or the orientations of reinforcing fibers are different. The prepreg sheets 7 to be used are selected in a plural number corresponding to the object of use of the robot hand 1 and the place where the robot hand member 4 is used, so as to form a carbon fiber composite material having the optimum flexural rigidity.

Then, as shown in FIG. 6A, the starting prepreg sheet 7 is cut to form prepreg sheet pieces 7', 7" of predetermined shapes. The prepreg sheet pieces 7', 7" are those to be laminated on respective divided regions (namely, upper surface, lower surface, left side surface and right side surface) of the outer peripheral surface of the core member 6, and are cut off from all starting prepreg sheets 7 to meet the sizes of the divided regions of the core member 6.

Next, as shown in FIG. 6B, the prepreg sheet pieces 7', 7" are laminated on the surfaces of the core member 6 to be adhered. The prepreg sheet pieces 7', 7" have not yet been set, and each has an adhering force to some extent. Therefore, the prepreg sheet pieces 7', 7" can be adhered onto the core member 6 on which a parting film has been stuck by simply laminating the sheets successively. However, it is preferable to pressing the prepreg sheet pieces 7', 7" while heating by means of an iron or the like. It is further preferable to laminate the prepreg sheet pieces 7', 7" so that the reinforcing fibers are oriented in the longitudinal direction and in a direction at right angles with the longitudinal direction.

Thus, the prepeg sheet pieces 7', 7" are laminated to be adhered onto the whole outer peripheral surface of the core member 6, to thereby form a member in a state where the outer peripheral surface of the core member 6 is covered with the prepreg sheet laminate 9.

Then, as shown in FIG. 6C, a cloth prepreg sheet 7*d* is wound on the outer periphery of the prepreg sheet laminate 9 one turn or few turns. By such a covering, it is possible to prevent the fluffing or fine splitting in the subsequent processing. Besides, even if there may be caused burring or steps at portions where the prepreg sheet pieces 7', 7" are joined together, it is possible to cover such burring or steps. Thereby, fine workpieces such as liquid crystal displays, plasma displays and silicon wafers are prevented from being scarred.

Then, as shown in FIG. 6D, the outer molds 10*c* and 10*d* (i.e., two holder plates 10*c*, and two thickness-setting plates 10*d* inserted between the two holder plates) are pushed onto the member covered with the cloth prepreg sheet 7*d* from the four sides. In this case, the holder plates 10*c* are pushed onto the upper and lower surfaces of the prepreg sheet laminate 9 in a state covered with the cloth prepreg sheet 7*d*, and the thickness-setting plates 10*d* are pushed onto the right and left side surfaces.

Thereafter, the prepreg sheet laminate 9 is put into a vacuum bag and is heated under predetermined conditions to be thermally set to form a fiber reinforced plastic (FRP). At this time, an external pressure in a specific direction may be exerted on the prepreg sheet laminate 9. For example, if the prepreg sheet laminate 9 is pressed from the upper side by means of a weight or the like so that no gap develops between the holder plates 10*c* and the thickness-setting plates 10*d*, the flatness of the upper surface (that is, supporting surface) of the robot hand member 4 is further improved and also a highly precise size (particularly, thickness) is obtained. Further, if the outer molds at the opposing positions are pushed by means of a vice or the like as indicated by arrows A and B or C and D, the joining performance of the adjacent prepreg sheet pieces 7', 7" at the edges thereof is further improved.

Then, as shown in FIG. 6E, the core member 6 is removed from a member 11 being the FRP through the above-mentioned processes. Thus, there is formed the robot hand member 4 of the hollow structure.

According to this production method, since the core member 6 has two functions of a so-called base member when laminating the prepreg sheet 7 and a so-called inner mold when heat-molding the robot hand member 4, it is possible to perform simultaneously the forming of the FRP plate (i.e., the laminating of prepreg sheet piece 7' or 7") and the molding of the robot hand member 4 (i.e., to join the prepreg sheet pieces 7' and 7" of the adjacent walls.

Therefore, it is possible to decrease the number of the production processes compared to a production method in which a skin layer is formed of the conventional FRP plate, and the skin layer is joined to a core layer serving as a core member. In particular, the naturally cooling time in the stage of forming the FRP plate is integrated with the time of adhesion in the stage of forming the robot hand member. Thus, it is possible to greatly decrease the time required for the production.

Further, for the method of producing the robot hand member of the hollow structure, there can be contrived a method of adhering together at the edges of the FRP plates of the four surfaces formed to meet the wall surfaces of the robot hand member. According to this method, however, there are disadvantages in that a complicated operation is required for adhering the FRP plates of the four surfaces at the edges thereof, the dimensional precision is decreased, the strength at the adhered portions is likely to be decreased, and the number of processes are increased since the FRP plates that have been formed by using the prepreg sheets are joined together. Contrary to this, according to the production method in this embodiment, since the robot hand member can produced by a relatively simple operation of adhering the prepreg sheet pieces 7', 7" onto the core member 6, the robot hand member of high dimensional precision can be produced within a short period of time maintaining. Besides, since the prepreg sheet pieces 7', 7" of the adjacent sections are adhered together simultaneously with the thermosetting of the prepreg sheet 7, it is possible to increase the strength at the joining portions.

Further, differently from the above-mentioned first production method, the corners are not swollen toward the outer side when the prepreg sheets are wound on the outer peripheral surface of the core member. Therefore, there is no need of using a dedicated outer mold that meets the outer surface shape of the robot hand member. In particular, since the outer mold is usually larger and more expensive than the inner mold, a high cost is necessary to separately prepare the outer molds or to provide various outer molds to meet the shapes of the robot hand members. According to this production method, however, there is only needed a general-purpose outer mold (i.e., holder plates 10*c* and thickness-setting plates 10*d*). Therefore, it is possible to suppress the cost required for the design modification of the robot hand and to improve the freedom of design. Thus, it is possible to quickly produce the robot hand member that meets the user requirements and to shorten the due term.

This production method is the same as the first production method with respect to that the robot hand member 4 may have a triangular shape, a polygonal shape, a circular shape or a semicircular shape in cross section, that the cloth prepreg sheet 7*d* needs not necessarily be wound on the outermost circumference of the prepreg sheet laminate 9, and that the prepreg sheet pieces 7', 7" to be adhered onto the core member 6 may be of a single layer.

Figure 7:
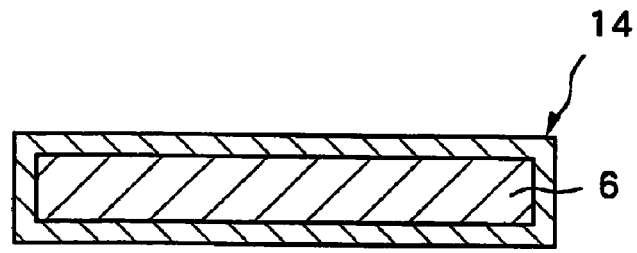
FIG. 7 is a sectional view illustrating a robot hand member of a second embodiment according to the present invention.

FIG. 7 illustrates a robot hand member 14 according to a second embodiment of the present invention. This robot hand member 14 is of a solid structure constituted by laminating prepreg sheets 7 each containing a reinforcing fiber on the whole peripheral surface of the core member 6, and heating the thus formed prepreg sheet laminate to a predetermined temperature to thermally set, to form a fiber reinforced plastic integrated with the core member 6.

A first method of producing the robot hand member 14 will be described hereunder. This production method complies with the first method of producing the robot hand member 4 in the first embodiment shown in FIG. 3. As the core member 6 having a predetermined shape in cross section in FIG. 3A, there is used a light-weight member made of, for example, a synthetic resin lighter than the FRP, which is not deformed by the heating at temperatures equal to or lower than a predetermined temperature and has the excellent adhesion performance to the prepreg sheet. The light-weight member is formed of a material which does not develop a gap to the FRP after molded by being heated, at temperatures equal to or less than a temperature slightly higher than the temperature in the process of heating the prepreg sheet laminate 9 to a predetermined temperature (although different depending upon the resin, usually from about 100 to about 190° C.) to thermally set. For example, there can be used such plastic materials as epoxy resin, phenol resin, unsaturated polyester resin, polyimide resin, bismaleimide resin, polyurethane resin and foamed materials thereof. The core member 6 may have its surfaces coarsened by being blasted with sand or by using a sand-paper in order to improve adhesion to the prepreg sheets 7. As required, further, an adhesive may be applied.

The production processes are executed quite in the same manner as the processes shown in FIGS. 3A, 3B and 3C. However, the process of obtaining the hollow structure by removing the core member 6 from the FRP member 11 shown in FIG. 3D is not executed. Namely, the production method is terminated with the process of heating the prepreg sheet laminate 9 shown in FIG. 3C to a predetermined temperature to thermally set, to form the FRP. In this case, too, since the core member 6 is made of material that is not deformed by the heating at temperatures equal to or lower than the predetermined temperature, it is not substantially deformed through the process of heating shown in FIG. 3C and correctly maintains its shape in cross section.

Thus, there is produced the robot hand member 14 of a solid structure with the core member 6 made of light-weight material remaining in the FRP. Then, there are formed, by machining, an air blow passage or an air suction passage for supporting and conveying the workpiece 3, a hole for arranging electric wires for a sensor that detects whether the workpiece 3 is present or is supported, and threaded holes for mounting. In the solid structure having the core member 6 in this embodiment, too, the decrease of the weight and the decrease of the number of the production processes are achieved.

The robot hand member 14 of the solid structure does not require the process of removing the core member 6 and thus, it is possible to greatly shorten the time required for the production. Further, since the core member 6 made of light-weight member is left, it is possible to eliminate disadvantages inherent in both the robot hand member of the hollow structure and the robot hand member made of the solid material. That is, in the case of the robot hand member of the hollow structure, there are disadvantages in that deformation with the time elapse such as denting in the central portion accompanying the use is caused, or, it is forced to modify the design concerning the portions where the grooves and holes are formed when replacing the conventional robot hand member made of the solid material by a new one. The robot hand member of the solid structure of this embodiment, however, is free from such disadvantages. Besides, the weight of the robot hand member as a whole can be decreased in a state of having a volume same as that of the robot hand member made of the solid material. It is therefore possible to suppress not only the deflection due to its own weight but also to suppress the deflection due to the load.

Next, a second method of producing the robot hand member 14 will be described. This production method complies with the second method of producing the robot hand member 4 in the first embodiment shown in FIG. 6. Like the first production method, for the core member 6, a light-weight material that has the excellent adhesion performance to the prepreg sheets and is lighter than the FRP member. In order to improve the adhesion performance to the prepreg sheet pieces 7', 7", it is preferable that the core member 6 has its surfaces coarsened or coated with an adhesive.

The processes of production are executed quite in the same manner as the processes shown in FIGS. 6A, 6B, 6C and 6D. However, the process of forming the hollow structure by removing the core member 6 from the FRP member 11 shown in FIG. 6E is not executed. Namely, the production method is terminated with the process of heating the prepreg sheet laminate 9 shown in FIG. 6D to a predetermined temperature to thermally set, to obtain the FRP.

Thus, there is produced the robot hand member 14 of a solid structure with the core member 6 made of light-weight material remaining in the FRP.

Figure 8:
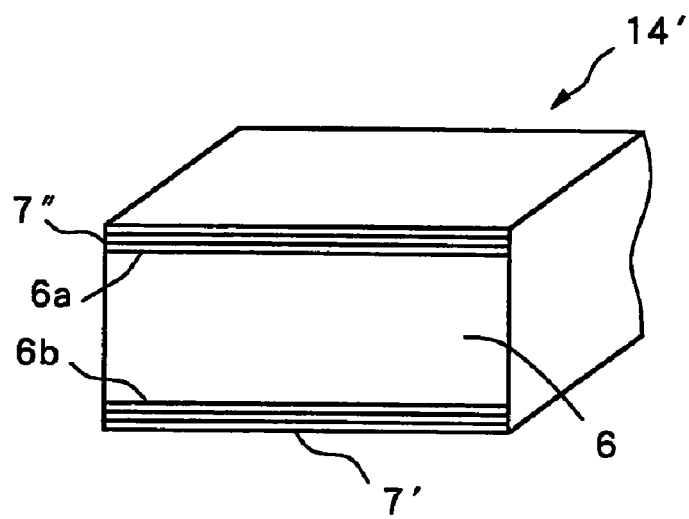
FIG. 8 is a perspective view illustrating a modified example of the robot hand member of the second embodiment.

FIG. 8 illustrates a modified example of the robot hand member 14 in the second embodiment. A robot hand member 14' is of a solid structure in which a prepreg sheets each containing a reinforcing fiber is laminated on a part of the outer peripheral surface of a core member, and heating the member on which the prepreg sheets are laminated to a predetermined temperature to thermally set, to form a fiber reinforced plastic integrated with the core member.

This method of producing the robot hand member complies with the second method of producing the robot hand member 14 in the second embodiment. The method is performed nearly in the same manner as the processes shown in FIGS. 6A to 6D except for that the prepreg sheet pieces 7' is laminated on only at least one of the divided regions (i.e., upper surface 6*a* and lower surface 6*b*) of the outer peripheral surface of the core member 6 in FIGS. 6A and 6B. Thus, there is produced the robot hand member 14' of the solid structure in which the core member 6 made of light-weight material is sandwiched by the FRPs.

In this robot hand member 14', the joining performance is required to be ensured between the core member 6 and the lowermost prepreg sheet piece 7'. Here, however, since the prepreg sheets 7 that have not yet been set is integrated with the core member due to the thermosetting, the joining performance is ensured to a sufficient degree. In order to further improve the joining performance, the surfaces (6*a*, 6*b*) of the core member 6 on which the prepreg sheets are to be laminated may be coarsened or may be coated with an adhesive. In the process of FIG. 6D, further, the thickness-setting plate 10*d* serving as the outer mold may be omitted.

According to this robot hand member 14', a small amount of the prepreg sheets 7 are used and therefore, the material cost is greatly decreased.

Figure 9:
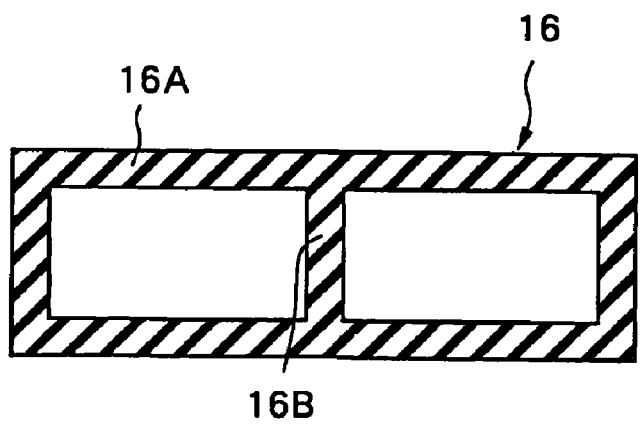
FIG. 9 is a sectional view illustrating a robot hand member of a third embodiment according to the present invention.
Figure 10A:
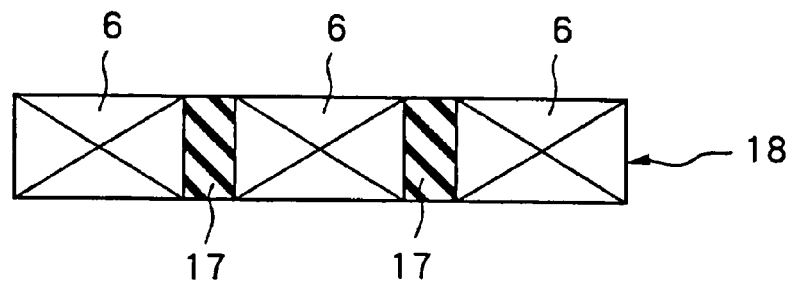
FIGS. 10A-10D are sectional views illustrating processes of a first method of producing the robot hand member of the third embodiment.
Figure 10B:
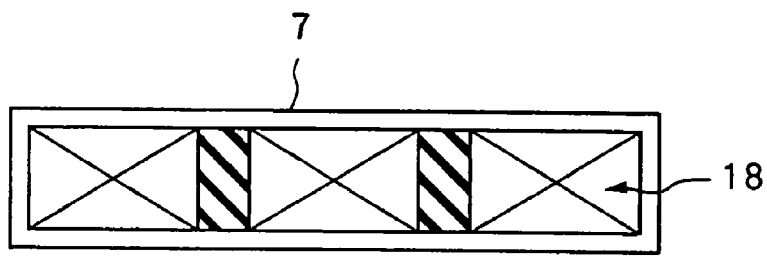
Figure 10C:
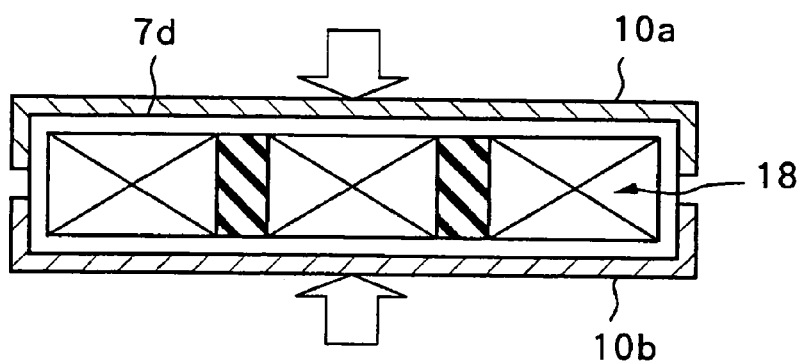
Figure 10D:
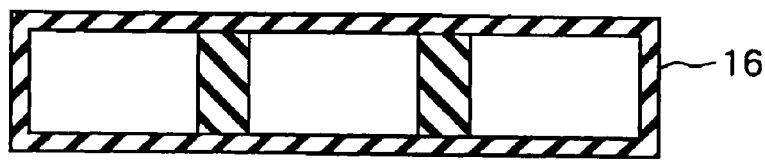

FIG. 9 illustrates a robot hand member 16 in a third embodiment according to the present invention. The robot hand member 16 is made of the FRP that is light in weight, and has excellent flatness, flexural rigidity and heat resistance. Here, the FRP is the one obtained by molding, into a predetermined shape, a prepreg sheet that is obtained by impregnating a reinforcing fiber such as carbon fiber, glass fiber, aramide fiber or silicon carbide fiber with a thermoset resin, and heating the prepreg sheet to a predetermined temperature to thermally set. The robot hand member 16 has at least one rib 16B extending between the opposing long sides in transverse cross section and also extending in a space formed by the constituent members 16A that is formed in a hollow rectangular shape in cross section and extends in the longitudinal direction.

According to this constitution, the long sides constituting the transverse cross section of the robot hand member 16 are connected to each other via the rib 16B, whereby the length of the long sides is substantially shortened to increase the rigidity. Further, the dent at the center of the long side is decreased to improve the flatness, i.e., to improve the precision of the robot hand member 16. In this case, since a sufficient degree of strength can be obtained even without increasing the thickness of the robot hand member 16, it is possible to prevent the increase in the deflection at the end caused by the increase in the weight.

Next, a first method of producing the robot hand member 16 will be described with reference to FIG. 10.

In a first process (see FIG. 10A), the core members 6 each of which has a rectangular shape in transverse cross section and is not deformed by the heating at temperatures equal to or lower than a predetermined temperature, are arranged on both side surfaces of rib-constituting member 17 having a rectangular shape in transverse cross section and containing a reinforcing member, to form a composite structure 18 having a rectangular shape in cross section as a whole.

Like the one used for the robot hand member in the first embodiment, the core member 6 is formed of a material that is not substantially deformed by the heating at temperatures equal to or less than a temperature slightly higher than a predetermined temperature for heating to thermally set the prepreg sheet and can be easily removed from the FRP after the heating and the thermosetting.

The rib-constituting member 17 is formed of a material that contains a reinforcing fiber such as carbon fiber, glass fiber, aramide fiber or silicon carbide fiber, and is integrated with the prepreg sheet when the prepreg sheet is thermally set. It is preferable that the rib-constituting member 17 is formed by cutting, into a predetermined size, the FRP formed in a plate shape by thermally setting the prepreg sheet in which the reinforcing fibers are laminated with the orientations thereof being different to each other.

Figure 11A:
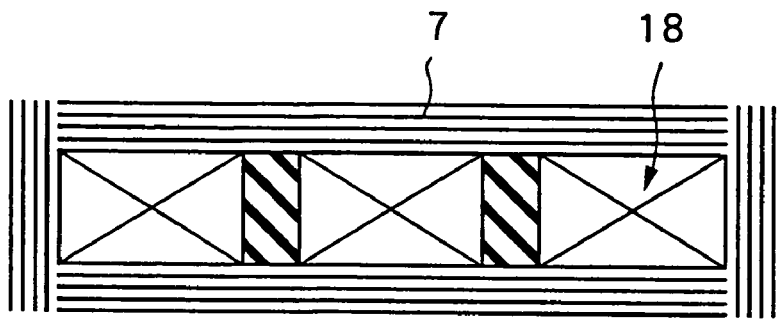
FIGS. 11A-11D are explanatory diagrams illustrating an example of laminated state of prepreg sheets in the first method of producing the robot hand member of the third embodiment.
Figure 11B:
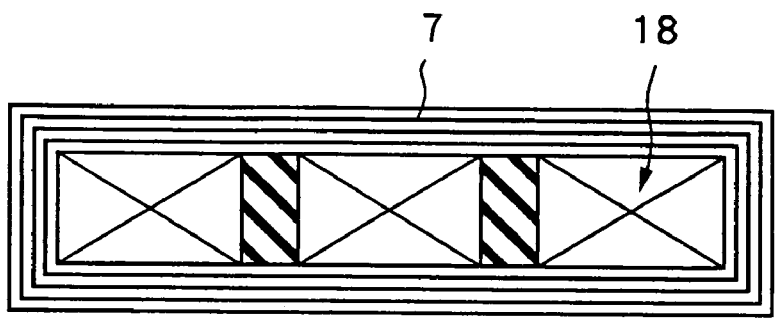

In a second process (see FIG. 10B), the prepreg sheets 7 containing the reinforcing fiber are laminated on the outer peripheral surface of the composite structure 18 in a predetermined thickness (e.g., about 1 to 7 mm). Here, in order to laminate the prepreg sheets 7 in a predetermined thickness, as shown in FIG. 11B, on the surfaces (upper, lower, right and left surfaces) of the composite structure 18, the prepreg sheets 7 formed to meet the shapes of these surfaces may be adhered and laminated. As shown in FIG. 11B, further, the prepreg sheets 7 may be wound and laminated on the outer peripheral surface of the composite structure 18. The adhesion and the winding in this case is preferably executed in such a manner that the reinforcing fibers are oriented in different directions.

Figure 11C:
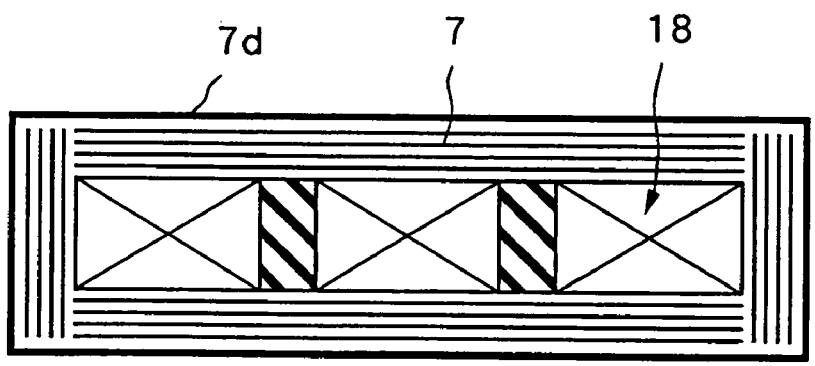
Figure 11D:
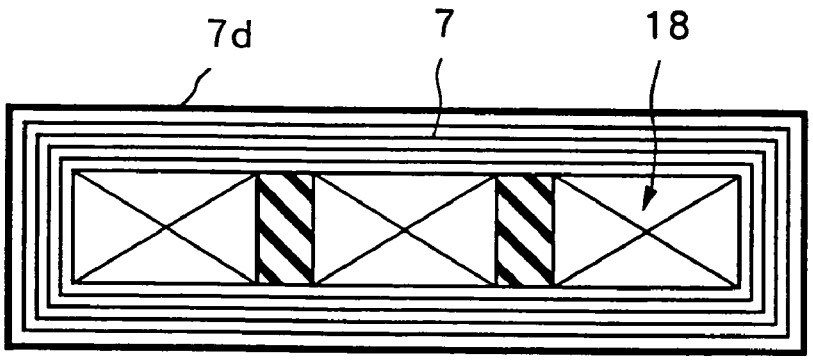
Figure 12A:
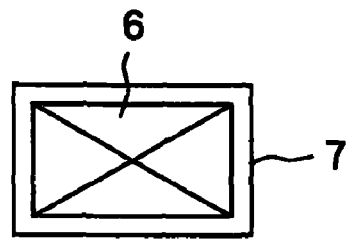
FIGS. 12A-12E are sectional views illustrating processes of a second method of producing the robot hand member of the third embodiment.
Figure 12B:
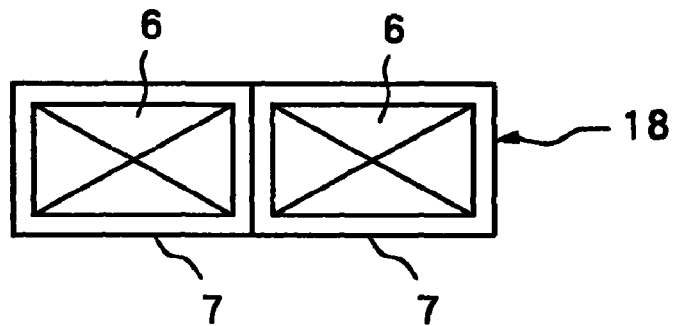
Figure 12C:
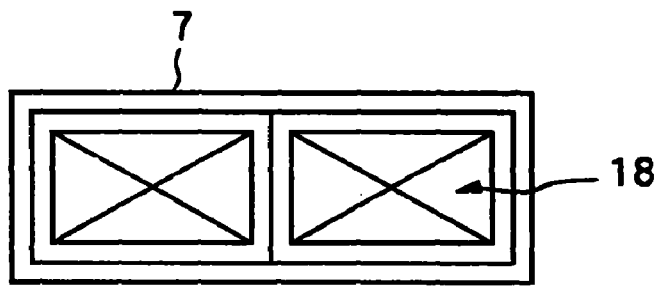
Figure 12D:
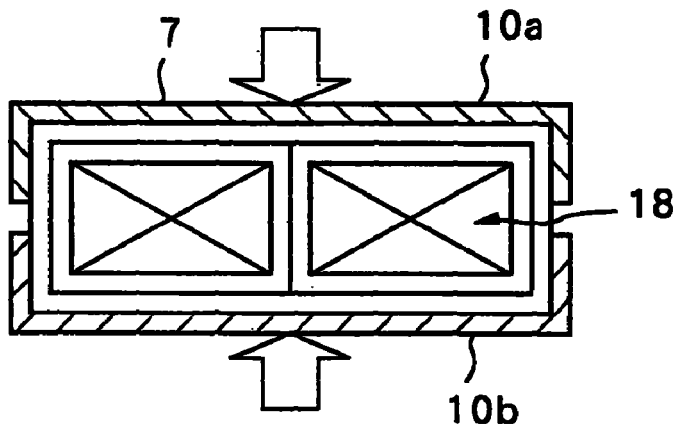
Figure 12E:
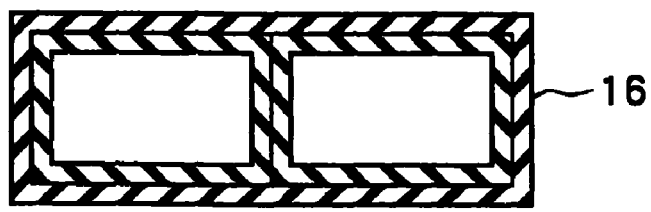

As shown in FIGS. 11C and 11D, further, the cloth prepreg sheet 7d constituted by a woven fabric of reinforcing fiber may be wound on the outer peripheral surface of the composite structure 18 on which the prepreg sheets 7 have been laminated, cover the composite structure 18.

In a third process (see FIG. 10C), the outer molds 10a and 10b each having a predetermined shape are pushed onto the outer peripheral surface of the composite structure 18 on which the prepreg sheets 7 are laminated, to thereby mold the outer surface shape of the composite structure 18 into a predetermined size. As the outer molds 10a and 10b, there may be used two channel-shaped outer molds (shown in the figure) each having U-shaped inner peripheral surface shape or four plate-like outer molds (FIG. 6D) corresponding to the laminating mode of the prepreg sheets 7 (see FIG. 11).

In a fourth process (not shown), the molded composite structure 18 is heated to a predetermined temperature, to form the FRP in which the rib-constituting members 17 and the prepreg sheets 7 are integrated.

In a fifth process (see FIG. 10D), the core member 6 is removed from the FRP to realize the robot hand member having the rib in inner space thereof.

According to the above-mentioned production method, the robot hand member 16 is produced such that the core members 6 are arranged on both side surfaces of the rib-constituting members 17 to form a composite structure 18 of a rectangular shape in cross section as a whole, the prepreg sheets 7 are laminated on the outer peripheral surface of the composite structure 18 in a predetermined thickness to be molded by using the outer molds 10a and 10b, the molded composite structure 18 is heated to a predetermined temperature to form an FRP in which the rib-constituting members 17 and the prepreg sheets 7 are integrated, and the core members 6 are removed therefrom. Therefore, if a plurality of kinds of core members 6 and rib-constituting members 17 of different sizes, it is possible to easily produce the robot hand member 16 of predetermined size having the rib in the inner space thereof by combining arbitrarily these members.

At this time, since the robot hand member 16 has the rib in the inner space thereof, the long sides constituting the transverse cross section are connected to each other through the rib. Accordingly, the length of the long sides is substantially shortened and the rigidity is increased. Since the dent is decreased at the center of the long sides, it is possible to improve the flatness, that is, the precision of the robot hand member 16.

The number of the chambers (number of division) in the inner space can be changed by changing the number of the core members 6 and the number of the rib-constituting members 17. In this case, the inner space partitioned by the rib-constituting members 17 can be utilized for arranging a tube for blowing or sucking the air for supporting and conveying the workpiece, and for arranging the electric wires for a sensor that detects whether the workpiece is present or is held. In the robot hand of solid in cross section in the prior art, the air suction passage and the like are formed by machining. Contrary to this, the embodiment according to the present invention can eliminate the cost required for the machining.

FIG. 12 illustrates a second method of producing the robot hand member 16.

In a first process (see FIG. 12A), the prepreg sheets 7 each containing the reinforcing fiber are laminated, in a predetermined thickness, on the outer peripheral surface of the core member 6 that is formed in a rectangular shape in transverse cross section and is not deformed by the heating at temperatures equal to or lower than a predetermined temperature. At this time, like in the first production method, the prepreg sheets 7 formed to meet the shapes of the surfaces (upper, lower, right and left surfaces) of the core member 6 may be adhered and laminated on the surfaces, or the prepreg sheets 7 may be wound and laminated on the outer peripheral surface of the core member 6. The directions in which the reinforcing fibers of the prepreg sheets are oriented may be determined relying upon the same technical idea as that of the first production method.

In a second process (see FIG. 12B), the side surfaces of a plurality of (two in this embodiment) core members 6 on which the prepreg sheets 7 are laminated are brought into contact with each other, to form the composite structure 18 of a rectangular shape in cross section as a whole.

In a third process (see FIG. 12C), the prepreg sheets 7 each containing the reinforcing fiber are laminated, in a predetermined thickness, on the outer peripheral surface of the composite structure 18. At this time, like in the first production method, the cloth prepreg sheet 7d may be wound on the outer peripheral surface of the composite structure 18 on which the prepreg sheets 7 have been laminated, to cover the composite structure 18.

In a fourth process (see FIG. 12D), the outer molds 10a and 10b each having a predetermined shape are pushed onto the outer peripheral surface of the composite structure 18 on which the prepreg sheets 7 have been laminated, to thereby mold the outer surface shape of the composite structure 18 into a predetermined size. As the outer molds 10a and 10b, there may be used those that meet the laminating mode of the prepreg sheets 7 like those of the first production method.

In a fifth process (not shown), the molded composite structure 18 is heated to a predetermined temperature to thereby form the FRP in which the prepreg sheets 7 laminated on the core members 6 and the prepreg sheets 7 laminated on the composite structure 18 are integrated.

In a sixth process (see FIG. 12E), the core members 6 are removed from the FRP to realize the robot hand member 16 having the rib in an inner space thereof.

According to the above-mentioned production method, the robot hand member 16 is produced such that the prepreg sheets 7 are laminated, in a predetermined thickness, on the outer peripheral surface of the core members 6 and the side surfaces thereof are brought into contact with each other to form the composite structure 18 of a rectangular shape in cross section as a whole; the prepreg sheets 7 are laminated on the outer peripheral surface of the composite structure 18 in a predetermined thickness, to mold the composite structure 18 by means of the outer molds 10a and 10b; the thus molded composite structure 18 is heated to a predetermined temperature to form an FRP in which the prepreg sheets 7 laminated on the core members 6 and the prepreg sheets 7 laminated on the composite structure 18 are integrated; and the core members 6 are removed therefrom. Thus, if a plurality of kinds of core members 6 of different sizes are prepared, it is possible to easily produce the robot hand member 16 of predetermined size having the rib in the inner space thereof, by arbitrarily selecting any core members 6 and by determining the numbers thereof. In this case, there is an advantage in that no rib-constituting member 17 used in the above first production method is required.

Figure 13A:
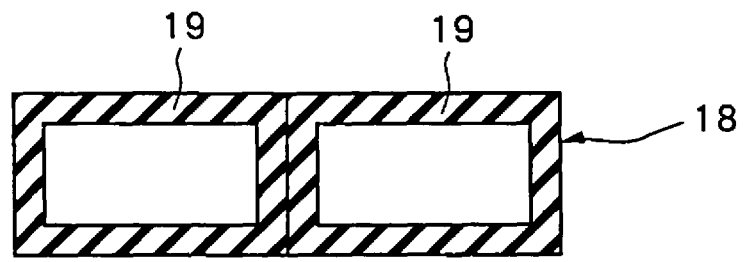
FIGS. 13A-13C are sectional views illustrating processes of a third method of producing the robot hand member of the third embodiment.
Figure 13B:
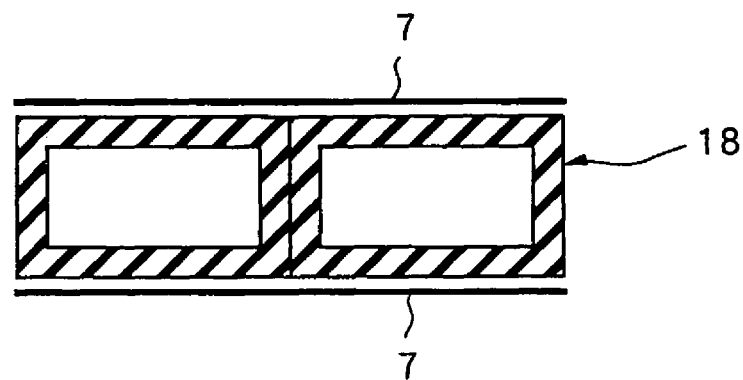

FIG. 13 illustrates a third method of producing the robot hand member 16.

In a first process (see FIG. 13A), the side surfaces of a plurality of unit constituent members 19 each of which are formed in a hollow rectangular shape in transverse cross section and contains a reinforcing fiber are brought into contact with each other to form the composite structure 18 of a rectangular shape in cross section as a whole. The unit constituent members 19 are each formed by, for example, cutting a plate-like FRP into a rectangular shape of a predetermined size and coupling the end surfaces thereof with an adhesive. The unit constituent members 19 may further be formed by utilizing the technology used in the above-mentioned embodiment, i.e., by laminating the prepreg sheets on the outer peripheral surface of the core member that is formed in a rectangular shape in transverse cross section and is not deformed by the heating at temperatures equal to or lower than a predetermined temperature, and then heating to thermally set the core member on which the prepreg sheets are laminated to the predetermined temperature. In short, the unit constituent members 19 having a hollow rectangular shape in transverse cross section may be formed by using any production methods.

In a second process (see FIG. 13B), the prepreg sheets 7 each containing a reinforcing fiber are adhered onto the side surfaces of the same sides (upper and lower surfaces in the example shown in the figure) intersecting the contact surfaces of the composite structure 18. The cloth prepreg sheet 7d may be adhered instead of the prepreg sheets 7.

In a third process (not shown), the composite structure 18 on which the prepreg sheets 7 are adhered is heated to a predetermined temperature, to thereby form the FRP in which the unit constituent members 19 and the prepreg sheets 7 are integrated. Thus, there is realized the robot hand member 16 having the rib in the inner space thereof.

According to the above-mentioned production method, the robot hand member 16 is produced such that the side surfaces of the plurality of unit constituent members 19 formed in a hollow rectangular shape in transverse cross section are brought into contact with each other to form the composite structure 18 a rectangular shape in cross section as a whole; the prepreg sheets 7 are adhered onto the side surfaces of the same sides intersecting the contact surfaces of the unit constituent members 19; and the composite structure 18 onto which the prepreg sheets 7 are adhered are heated, to form an FRP in which the unit constituent members 19 and the prepreg sheets 7 are integrated. Thus, if a plurality of kinds of unit constituent members 19 having different sizes are prepared, it is possible to easily produce the robot hand member 16 of predetermined size having the rib in the inner space thereof by combining arbitrarily these members. In this case, the rib is constituted by the contact surfaces of the unit constituent members 19.

Figure 13C:
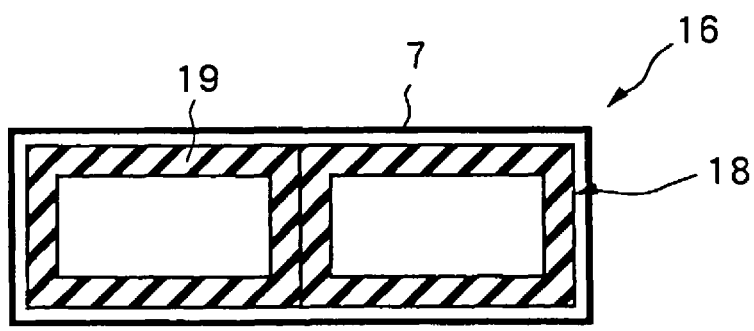
Figure 14A:
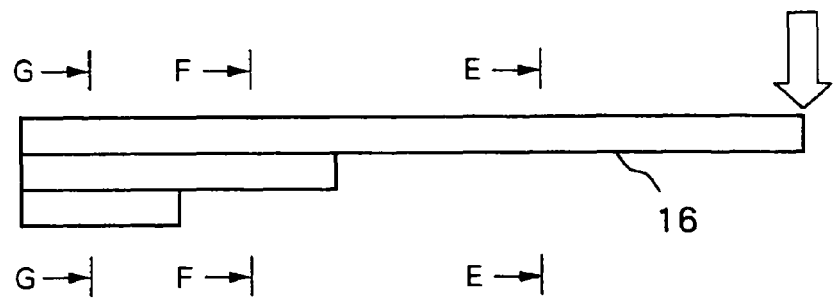
Figure 14B:
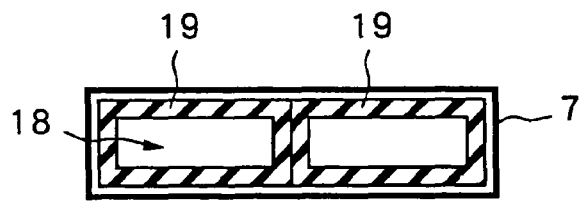
Figure 14C:
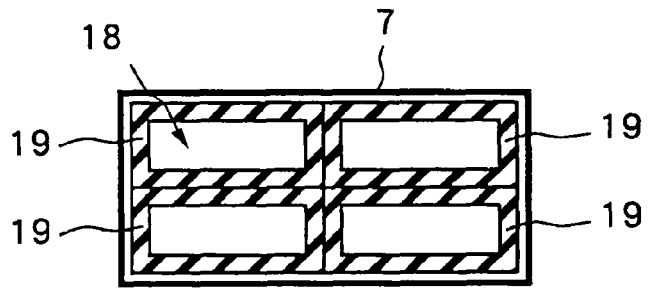
Figure 14D:
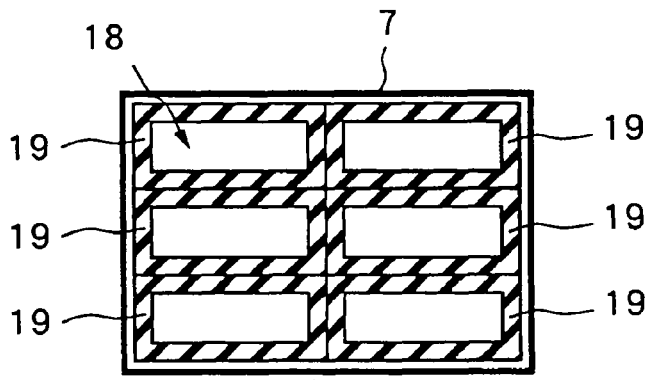

In the second process of adhering the prepreg sheets 7 to the composite structure 18, as shown in FIG. 13C, the prepreg sheets 7 may be adhered by being wound on the outer peripheral surface of the composite structure 18. In this case, since the prepreg sheets 7 are adhered to the whole outer circumference of the composite structure 18 constituted of a plurality of unit constituent members 19, the steps at the contact portions appear less conspicuously, and the robot hand member 16 exhibits favorable appearance to boost up a commercial value. Further, a cloth prepreg sheet may be wound on the outer peripheral surface of the composite structure 18 on which the prepreg sheets 7 are adhered, to cover the composite structure 18.

When the robot hand member 16 is long as shown in FIG. 14, the base end thereof on which a large bending moment acts may be constituted in a multiplicity of layers to suppress the deflection due to the load at the end of the robot hand member 16. In this case, the unit constituent members 19 are brought into contact with one another in a multiplicity of layers to form the composite structure 18 and, then, prepreg sheets 7 are laminated on the whole outer surface of the composite structure 18, thereafter to be subjected to the thermosetting. Such a technique can also be applied to the above-mentioned second production method.

Described below are Examples and Comparative Examples of the robot hand member in the first and second embodiments according to the present invention.

(1) Comparative Example

Lamination of a Solid CFRP Member

TABLE 1

Lamination of a solid member CFRP plate, 12 mm thickness

| Kinds of prepreg | Thickness (mm/sheet) | Laminating direction (degree) | Number of lamination (sheet) | Total thickness (mm) |
|---|---|---|---|---|
| Cloth prepreg | 0.25 | 0/90 | 1 | 0.25 |
| Prepreg-A (800GPa) | 0.22 | 0 | 12 | 2.64 |
| Prepreg-B(240 Gpa) | 0.20 | 90 | 8 | 1.6 |
| Prepreg-B | 0.27 | 0 | 11 | 3.0 |
| Prepreg-B | 0.20 | 90 | 8 | 1.6 |
| Prepreg-A | 0.22 | 0 | 12 | 2.64 |
| Cloth prepreg | 0.25 | 0/90 | 1 | 0.25 |
| Total | | | 44 | 12.0 |
| Deflection due to own weight (mm) | | 1.6 | | |
| Weight (kg) | | 1.53 | | |

This Comparative Example deals with a robot hand member made of the solid CFRP members described in connection with the related art, and Table 1 shows numerical values involved in the production. This Comparative Example uses a total of seven layers. That is, there are used cloth prepregs in which carbon fibers are oriented in the directions crossing the longitudinal direction at 0 degree and 90 degrees, prepregs-A in which the pitch carbon fibers having the tensile elasticity of 800 GPa are oriented in a direction of an angle of 0 degree, and prepregs-B in which the PAN carbon fibers having the tensile elasticity of 240 GPa are oriented in a direction of an angle of 90 degrees. More specifically, the layer including eleven sheets of laminated prepregs-B, each containing therein 0-degree oriented carbon fibers, is prepared and arranged as a central layer, and subsequently two different layers, each including eight sheets of laminated prepregs-B containing respectively 90-degree oriented carbon fibers, are arranged on the upper and lower faces of the above-mentioned central layer, respectively. Moreover, two further layers, each including twelve sheets of laminated prepregs-A are arranged on the upper and lower outer faces of the above-arranged two layers of the laminated prepregs-B. Finally, two more layers, each including one sheet of cloth prepreg, are laminated onto the above-arranged two further layers of the laminated prepregs-A in such a manner that the two outermost layers are formed. Thus, the aforementioned total of seven-layer construction is provided. The resultant CFRP plate has a thickness of 12 mm, the deflection due to its own weight is 1.6 mm, and the weight is 1.53 kg.

(2) Example 1

Lamination of a Hollow CFRP Structure

TABLE 2

Lamination of a hollow structure (square pipe 12 mm thickness CFRP plate 2.55 mm thickness)

| Kinds of prepreg | Thickness (mm/sheet) | Laminating direction (degree) | Number of lamination (sheet) | Total thickness (mm) |
|---|---|---|---|---|
| Cloth prepreg | 0.25 | 0/90 | 1 | 0.25 |
| Prepreg-A | 0.22 | 0 | 5 | 1.1 |
| Prepreg-B | 0.20 | 90 | 6 | 1.2 |
| Core member (aluminum et al) | 6.9 | — | 1 | 6.9 |
| Prepreg-B | 0.20 | 90 | 6 | 1.2 |
| Prepreg-A | 0.22 | 0 | 5 | 1.1 |
| Cloth prepreg | 0.25 | 0/90 | 1 | 0.25 |
| Total | | | 24 | 12.0 |
| Deflection due to own weight (mm) | | 0.47 | | |
| Weight (kg) | | 0.75 | | |
| Thickness (mm) | | | | |
| Longitudinal direction | 12.1 (front), 11.8 (middle), 12.1 (rear) | | | |
| Width direction | 12.0 (left), 11.8 (middle), 12.0 (right) | | | |

This Example 1 deals with the robot hand member 4 of a hollow structure shown in FIG. 2 produced by the first production method shown in FIG. 3. Table 2 shows numerical values involved in the production. This Example uses a total of six layers. That is, there are used cloth prepregs in which carbon fibers are oriented in the directions crossing the longitudinal direction at 0 degree and 90 degrees, prepregs-A in which the pitch carbon fibers having the tensile elasticity of 800 GPa are oriented in a direction of an angle of 0 degree, prepregs-B in which the PAN carbon fibers having the tensile elasticity of 240 GPa are oriented in a direction of an angle of 90 degrees, and a core member made of aluminum. More specifically, around the outer circumference of the core member made of aluminum and so forth, are wound six sheets of prepregs-B to form a first layer of the prepregs-B. Subsequently, around the outer circumference of the first layer of prepregs-B are wound five sheets of the prepregs-A to form a second layer of prepregs-A, and finally, around the outer circumference of the second layer of prepregs-A are wound one sheet of cloth prepreg to form the outermost layer of cloth prepreg. As a result, the aforementioned six-layer construction is provided. The laminate of prepregs is thermally set, and thereafter, the core member is removed therefrom to form a hollow structure. The resultant CFRP plate has a thickness of 2.55 mm, the square pipe has a thickness of 12 mm, the deflection due to its own weight is 0.47 mm, and the weight is 0.75 kg. The robot hand member has a thickness of 11.8 mm at its central portion, which is slightly dented compared to the thicknesses (12.0 mm, 12.1 mm) at the ends. However, there is not any problem in supporting and conveying the workpieces and excellent flatness can be obtained.

As compared to Comparative Example, the weight in Example 1 is decreased from 1.53 kg down to 0.75 kg and the deflection due to the own weight is decreased from 1.6 mm down to 0.47 mm, from which it will be understood that the robot hand member of the hollow structure of this invention is light in weight and prevents the deflection to a large degree. The same results are obtained even from the robot hand member 4 produced by the second production method.

(3) Example 2

Lamination of a CFRP Solid Structure

TABLE 3

Lamination of a solid structure
☐square pipe☐12 mm thickness☐CFRP plate☐2.55 mm thickness, foamed urethane core member☐

| Kinds of prepreg | Thickness (mm/sheet) | Laminating direction ☐degree☐ | Number of lamination ☐sheet☐ | Total thickness (mm) |
|---|---|---|---|---|
| Cloth prepreg | 0.25 | 0/90 | 1 | 0.25 |
| Prepreg-A | 0.22 | 0 | 5 | 1.1 |
| Prepreg-B | 0.20 | 90 | 6 | 1.2 |
| Core member (foamed urethane) | 6.9 | — | 1 | 6.9 |
| Prepreg-B | 0.20 | 90 | 6 | 1.2 |
| Prepreg-A | 0.22 | 0 | 5 | 1.1 |
| Cloth prepreg | 0.25 | 0/90 | 1 | 0.25 |
| Total | | | 24 | 12.0 |
| Deflection due to own weight (mm) | | 0.57 | | |
| Weight (kg) | | 1.06 | | |
| Thickness (mm) | | | | |
| Longitudinal direction | 12.0 (front), 12.0 (middle), 12.0 (rear) | | | |
| Width direction | 12.0 (left), 12.0 (middle), 12.0 (right) | | | |

This Example 2 deals with the robot hand member 14 of a solid structure shown in FIG. 7 produced by the first production method. Table 3 shows numerical values involved in the production. This Example uses a total of six layers. That is, there are used cloth prepregs in which carbon fibers are oriented in the directions crossing the longitudinal direction at 0 degree and 90 degrees, prepregs-A in which the pitch carbon fibers having the tensile elasticity of 800 GPa are oriented in a direction of an angle of 0 degree, prepregs-B in which the PAN carbon fibers having the tensile elasticity of 240 GPa are oriented in a direction of an angle of 90 degrees, and a core member made of a light-weight material of foamed urethane. More specifically, around the outer circumference of the core member made of a lightweight material of foamed urethane, are wound six sheets of prepregs-B to form a first layer of the prepregs-B. Subsequently, around the outer circumference of the first layer of prepregs-B are wound five sheets of the prepregs-A to form a second layer of prepregs-A, and finally, around the outer circumference of the second layer of prepregs-A are wound one sheet of cloth prepreg to form the outermost layer of cloth prepreg. As a result, the aforementioned six-layer construction is provided. The laminate of prepregs is thermally set with the core member being left therein. The resultant CFRP plate has a thickness of 2.55 mm, the square pipe has a thickness of 12 mm, the deflection due to its own weight is 0.57 mm and the weight is 1.06 kg. The robot hand member has a thickness of (12.0 mm) which is the same even at the end portions and at its central portion, from which it will be understood that this robot hand member is superior concerning the flatness to the robot hand member of the hollow structure of Example 1.

As compared to Comparative Example, the weight in Example 2 is decreased from 1.53 kg down to 1.06 kg and the deflection due to the own weight is decreased from 1.6 mm down to 0.57 mm, from which it will be understood that the robot hand member of the solid structure of this invention, too, is light in weight and prevents the deflection to a high degree compared to the robot hand member produced by using the CFRP solid material. The same results are obtained even from the robot hand member 14 produced by the second production method.

The entire contents of Japanese Patent Application Nos. 2001-97478 and 2001-97479 filed on Mar. 29, 2001, respectively, and Japanese Patent Application No. 2001-115215 filed on Apr. 13, 2001, priorities of which are claimed, are incorporated herein by reference.

What is claimed is:

1. A method of producing a robot hand member which is mounted on an arm unit of an industrial robot, the robot hand member being essentially composed of a fiber reinforced plastic obtained by laminating prepreg sheets containing therein carbon fibers to have a generally rectangular-shaped cross section and by heating said laminated prepreg sheets to a predetermined temperature to thereby be thermally set, the method comprising the steps of:

winding prepreg sheets in multi-layer on the outer peripheral surface of a core member that is made of a metallic or resin material having a non-deformable property at temperatures equal to or lower than the predetermined temperature and a thermal expansion coefficient larger than that of said fiber reinforced plastic, the core member being formed to have a generally rectangular-shaped cross section;

molding the outer surface shape of said wound prepreg sheets into a predetermined size by pushing an outer mold having a predetermined inner surface shape onto the outer peripheral surface of said wound prepreg sheets;

heating said molded prepreg sheets to the predetermined temperature to thermally set the heated prepreg sheets, to form the fiber reinforced plastic; and removing the core member from said fiber reinforced plastic to form a hollow structure, wherein said step of winding prepreg sheets in multi-layer comprises:

laminating prepreg sheets which contain therein PAN-based carbon fibers having an orientation direction thereof oriented in a direction of 90 degrees with respect to a longitudinal direction of the core member to form an innermost layer;

laminating prepreg sheets which contain therein pitch-based carbon fibers having a coefficient of tensile elasticity higher than that of said PAN-based carbon fibers and an orientation direction thereof oriented in a direction of 0 degrees with respect to the longitudinal direction of the core member to form an intermediate layer; and laminating cloth prepreg sheets which contain therein carbon fibers arranged to have orientation directions mutually intersecting at 90 degrees to form an outermost layer.

2. A method of producing a robot hand member which is mounted on an arm unit of an industrial robot, the robot hand member being essentially composed of a fiber reinforced plastic obtained by laminating prepreg sheets containing therein carbon fibers to have a generally rectangular-shaped cross section and by heating said laminated prepreg sheets to a predetermined temperature to thereby be thermally set, the method comprising the steps of:

winding prepreg sheets in multi-layer on the outer peripheral surface of a core member that is made of a metallic or resin material having a non-deformable property at temperatures equal to or lower than the predetermined temperature and a thermal expansion coefficient larger than that of said fiber reinforced plastic, the core member being formed to have a generally rectangular-shaped cross section;

molding the outer surface shape of said wound prepreg sheets into a predetermined size by pushing an outer mold having a predetermined inner surface shape onto the outer peripheral surface of said wound prepreg sheets; and heating said molded prepreg sheets to the predetermined temperature to thermally set the heated prepreg sheets, to form a fiber reinforced plastic integrated with the core member, wherein said step of winding prepreg sheets in multi-layer comprises:

laminating prepreg sheets which contain therein PAN-based carbon fibers having an orientation direction thereof oriented in a direction of 90 degrees with respect to a longitudinal direction of the core member to form an innermost layer;

laminating prepreg sheets which contain therein pitch-based carbon fibers having a coefficient of tensile elasticity higher than that of said PAN-based carbon fibers and an orientation direction thereof oriented in a direction of 0 degrees with respect to the longitudinal direction of the core member to form an intermediate layer; and laminating cloth prepreg sheets which contain therein carbon fibers arranged to have orientation directions mutually intersecting at 90 degrees to form an outermost layer.

3. A method of producing a robot hand member which is mounted on an arm unit of an industrial robot, the robot hand member being essentially composed of a fiber reinforced plastic obtained by laminating prepreg sheets containing therein carbon fibers to have a generally rectangular-shaped cross section and by heating said laminated prepreg sheets to a predetermined temperature to thereby be thermally set, the method comprising the steps of:

arranging core members each of which is made of a metallic or resin material having a non-deformable property at temperatures equal to or lower than the predetermined temperature and a thermal expansion coefficient larger than that of said fiber reinforced plastic, the core member being formed to have a generally rectangular-shaped cross section, on both side surfaces of a rib-constituting member formed in a rectangular shape in transverse cross section and containing the carbon fibers, to form a composite structure having a rectangular shape in cross section as a whole;

laminating prepreg sheets in a predetermined thickness on the outer peripheral surface of said composite structure;

heating said composite structure on which the prepreg sheets are laminated to the predetermined temperature, to form a fiber reinforced plastic in which said rib-constituting member and the prepreg sheets are integrated; and removing the core members from the fiber reinforced plastic, wherein said step of laminating prepreg sheets in the predetermined thickness comprises:

laminating prepreg sheets which contain therein PAN-based carbon fibers having an orientation direction thereof oriented in a direction of 90 degrees with respect to a longitudinal direction of the core member to form an innermost layer;

laminating prepreg sheets which contain therein pitch-based carbon fibers having a coefficient of tensile elasticity higher than that of said PAN-based carbon fibers and an orientation direction thereof oriented in a direction of 0 degrees with respect to the longitudinal direction of the core member to form an intermediate layer; and laminating cloth prepreg sheets which contain therein carbon fibers arranged to have two orientation directions mutually intersecting at 90 degrees to form an outermost layer.

4. A method of producing a robot hand member according to claim 3, wherein said step of laminating prepreg sheets in a predetermined thickness adheres to laminate prepreg sheets formed to meet the shape of the surface of the composite structure or the shapes of the surfaces of the core members on the surface of the composite structure or the surfaces of the core members.

5. A method of producing a robot hand member according to claim 3, wherein said step of laminating prepreg sheets in a predetermined thickness winds to laminate the prepreg sheets on the outer peripheral surface of the composite structure or the outer peripheral surfaces of the core members.

6. A method of producing a robot hand member which is mounted on an arm unit of an industrial robot, the robot hand member being essentially composed of a fiber reinforced plastic obtained by laminating prepreg sheets containing therein carbon fibers to have a generally rectangular-shaped cross section and by heating said laminated prepreg sheets to a predetermined temperature to thereby be thermally set, the method comprising the steps of:

laminating prepreg sheets in a predetermined thickness on the outer peripheral surfaces of core members each of which is made of a metallic or resin material having a non-deformable property at temperatures equal to or lower than a predetermined temperature and a thermal expansion coefficient larger than that of said fiber reinforced plastic, the core members being formed to have a generally rectangular-shaped cross section;

bringing the plurality of core members on which the prepreg sheets are laminated, respectively, into contact with one another on their side surfaces, to form a composite structure having a rectangular shape in cross section as a whole;

laminating prepreg sheets in a predetermined thickness on the outer peripheral surface of said composite structure;

heating said composite structure on which the prepreg sheets are laminated to the predetermined temperature, to form a fiber reinforced plastic in which the prepreg sheets laminated on said core members and the prepreg sheets laminated on said composite structure are integrated; and removing said core members from said fiber reinforced plastic, wherein said step of laminating prepreg sheets in the predetermined thickness comprises:

laminating prepreg sheets which contain therein PAN-based carbon fibers having an orientation direction thereof oriented in a direction of 90 degrees with respect to a longitudinal direction of the core member to form an innermost layer;

laminating prepreg sheets which contain therein pitch-based carbon fibers having a coefficient of tensile elasticity higher than that of said PAN-based carbon fibers and an orientation direction thereof oriented in a direction of 0 degrees with respect to the longitudinal direction of the core member to form an intermediate layer; and laminating cloth prepreg sheets which contain therein carbon fibers arranged to have two orientation directions mutually intersecting at 90 degrees to form an outermost layer.

7. A method of producing a robot hand member according to claim 6, wherein said step of laminating prepreg sheets in a predetermined thickness adheres to laminate prepreg sheets formed to meet the shape of the surface of the composite structure or the shapes of the surfaces of the core members on the surface of the composite structure or the surfaces of the core members.

8. A method of producing a robot hand member according to claim 6, wherein said step of laminating prepreg sheets in a predetermined thickness winds to laminate the prepreg sheets on the outer peripheral surface of the composite structure or the outer peripheral surfaces of the core members.

9. A method of producing a robot hand member which is mounted on an arm unit of an industrial robot, the robot hand member being essentially composed of a fiber reinforced plastic obtained by laminating prepreg sheets containing therein carbon fibers to have a generally rectangular-shaped cross section and by heating said laminated prepreg sheets to a predetermined temperature to thereby be thermally set, the method comprising the steps of:

bringing a plurality of unit constituent members each having a hollow rectangular shape in transverse cross section and containing the carbon fibers into contact with one another on their side surfaces, to form a composite structure having a rectangular shape in cross section as a whole;

adhering prepreg sheets over the side surfaces on the same sides intersecting the contacting surfaces of said composite structure; and heating said composite structure onto which the prepreg sheets are adhered, to a predetermined temperature, to form a fiber reinforced plastic in which said unit constituent members and the prepreg sheets are integrated, wherein said step of laminating prepreg sheets in the predetermined thickness comprises:

laminating prepreg sheets which contain therein PAN-based carbon fibers having an orientation direction thereof oriented in a direction of 90 degrees with respect to a longitudinal direction of the core member to form an innermost layer;

laminating prepreg sheets which contain therein pitch-based carbon fibers having a coefficient of tensile elasticity higher than that of said PAN-based carbon fibers and an orientation direction thereof oriented in a direction of 0 degrees with respect to the longitudinal direction of the core member to form an intermediate layer; and laminating cloth prepreg sheets which contain therein carbon fibers arranged to have two orientation directions mutually intersecting at 90 degrees to form an outermost layer.

10. A method of producing a robot hand member according to claim 9, wherein said step of adhering prepreg sheets winds to adhere prepreg sheets onto the outer peripheral surface of said composite member.

* * * * *